US011210634B2

(12) United States Patent
Phinney et al.

(10) Patent No.: US 11,210,634 B2
(45) Date of Patent: *Dec. 28, 2021

(54) PROCEDURE FLOW ADMINISTRATION SYSTEM AND METHOD

(71) Applicant: GEMBA SOFTWARE SOLUTIONS INC., Saint-John (CA)

(72) Inventors: Adrian Phinney, Toronto (CA); Micah Peterson, Quispamsis (CA)

(73) Assignee: GEMBA SOFTWARE SOLUTIONS INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/741,261

(22) Filed: Jan. 13, 2020

(65) Prior Publication Data
US 2020/0151671 A1 May 14, 2020

Related U.S. Application Data

(62) Division of application No. 14/877,968, filed on Oct. 8, 2015, now Pat. No. 10,552,797.
(Continued)

(51) Int. Cl.
*G06Q 10/10* (2012.01)
*G06F 3/0485* (2013.01)

(52) U.S. Cl.
CPC ......... *G06Q 10/103* (2013.01); *G06F 3/0485* (2013.01); *G06F 2203/04803* (2013.01); *G06F 2203/04806* (2013.01)

(58) Field of Classification Search
None
See application file for complete search history.

(56) References Cited

U.S. PATENT DOCUMENTS

2002/0116399 A1\* 8/2002 Camps .................. G06Q 10/10
2003/0204404 A1   10/2003 Weldon et al.
(Continued)

FOREIGN PATENT DOCUMENTS

WO      200341033 A1    5/2003
WO      200415897 A2    2/2004
WO      2014200841 A1  12/2014

OTHER PUBLICATIONS

M. Held and W. Blochinger, "Collaborative BPEL Design with a Rich Internet Application," 2008 Eighth IEEE International Symposium on Cluster Computing and the Grid (CCGRID), 2008, pp. 202-209, doi: 10.1109/CCGRID.2008.25 (Year: 2008).\*

*Primary Examiner* — Lynda Jasmin
*Assistant Examiner* — Laura Yesildag
(74) *Attorney, Agent, or Firm* — Lavery, De Billy, LLP; Hugh Mansfield

(57) ABSTRACT

A method and system for collaboration between users for editing and reviewing a live procedure flow comprising at least one decision step and at least one action step is disclosed. Each step is interconnected with at least one other step by at least one flow arrow indicating a direction of flow. There is disclosed a method of displaying a live version and an edited version of a procedure flow on a display device side-by-side and highlighting the edited portions in both the live version and an edited version while providing for synchronised scrolling of both versions. There is disclosed a method of navigating between procedure flows of a given procedure comprising rendering a graphical representation of a procedure flow, comprising steps, on a display, anchoring a hyperlink on one of the steps wherein when the hyperlink is selected, a sub procedure flow is displayed.

7 Claims, 44 Drawing Sheets

Related U.S. Application Data

(60) Provisional application No. 62/132,874, filed on Mar. 13, 2015.

(56) References Cited

U.S. PATENT DOCUMENTS

| | | | |
|---|---|---|---|
| 2004/0078373 A1* | 4/2004 | Ghoneimy | G06Q 10/10 |
| 2004/0133876 A1 | 7/2004 | Sproule | |
| 2013/0060612 A1 | 3/2013 | Hurd | |
| 2013/0205246 A1 | 8/2013 | Schmidt | |
| 2014/0129645 A1 | 5/2014 | Mo | |
| 2014/0201264 A1 | 7/2014 | Soon-Shiong | |
| 2014/0236663 A1 | 8/2014 | Smith et al. | |
| 2014/0236843 A1 | 8/2014 | Bain et al. | |
| 2014/0258882 A1 | 9/2014 | Latzina et al. | |
| 2015/0026260 A1 | 1/2015 | Worthley | |
| 2015/0082271 A1* | 3/2015 | Damonte | G06F 8/10 717/105 |
| 2015/0370467 A1* | 12/2015 | Holmes-Higgin | G06Q 10/103 715/738 |
| 2016/0350084 A1* | 12/2016 | Waggoner | G06F 8/34 |
| 2017/0132200 A1* | 5/2017 | Noland | G06F 40/186 |

\* cited by examiner

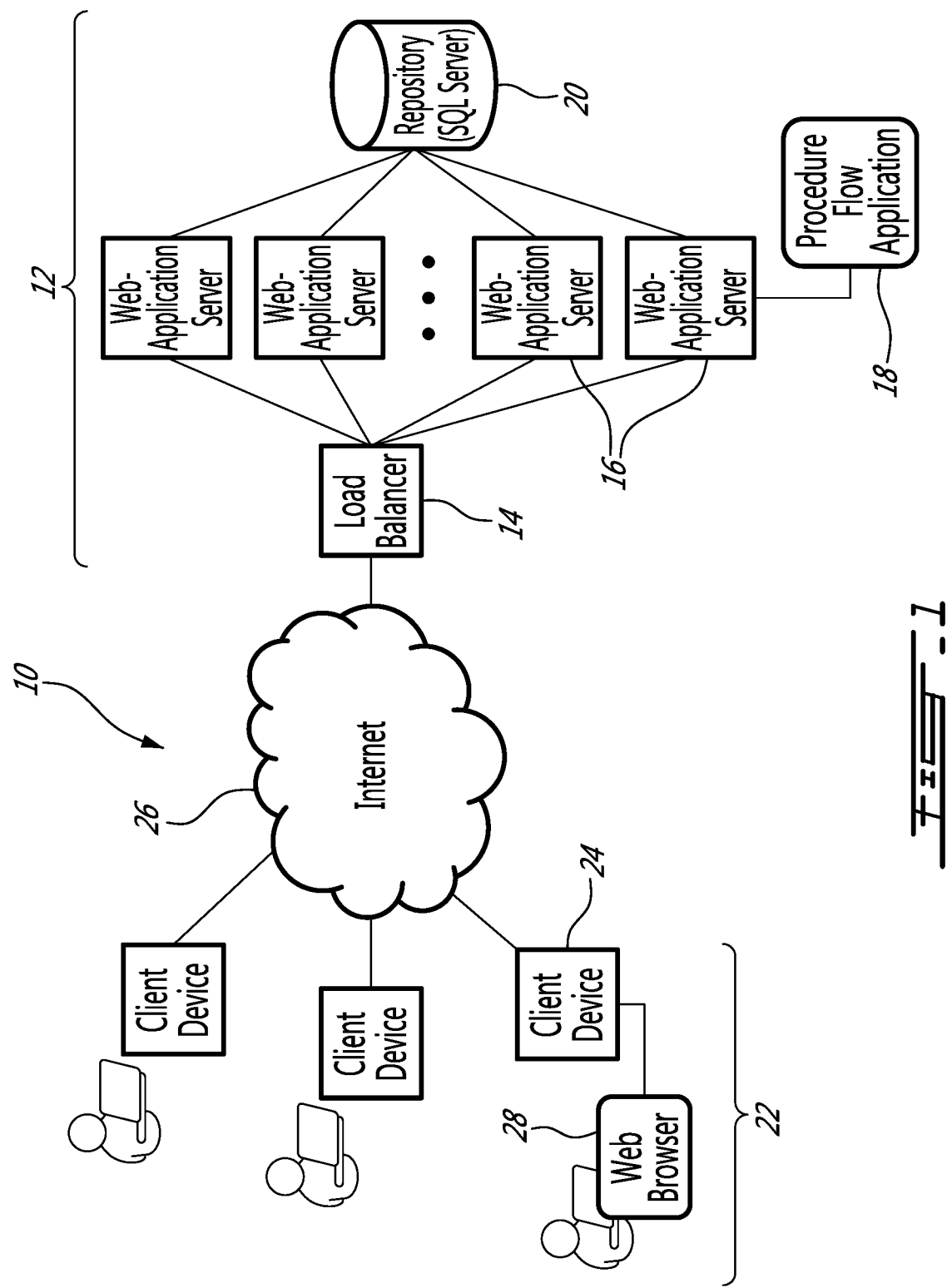

Administration / Users / Invite Users

Emails
newuser1@mydomain.ca;
newuser2@mydomain.ca;

Enter multiple email addresses separated by commas, semicolons or new lines.

Entry Points
Assign these users to one or more entry points.

Select: [All] [None]

202 — Entry Point Name    204 — Entry Point Role

FIG. 2C

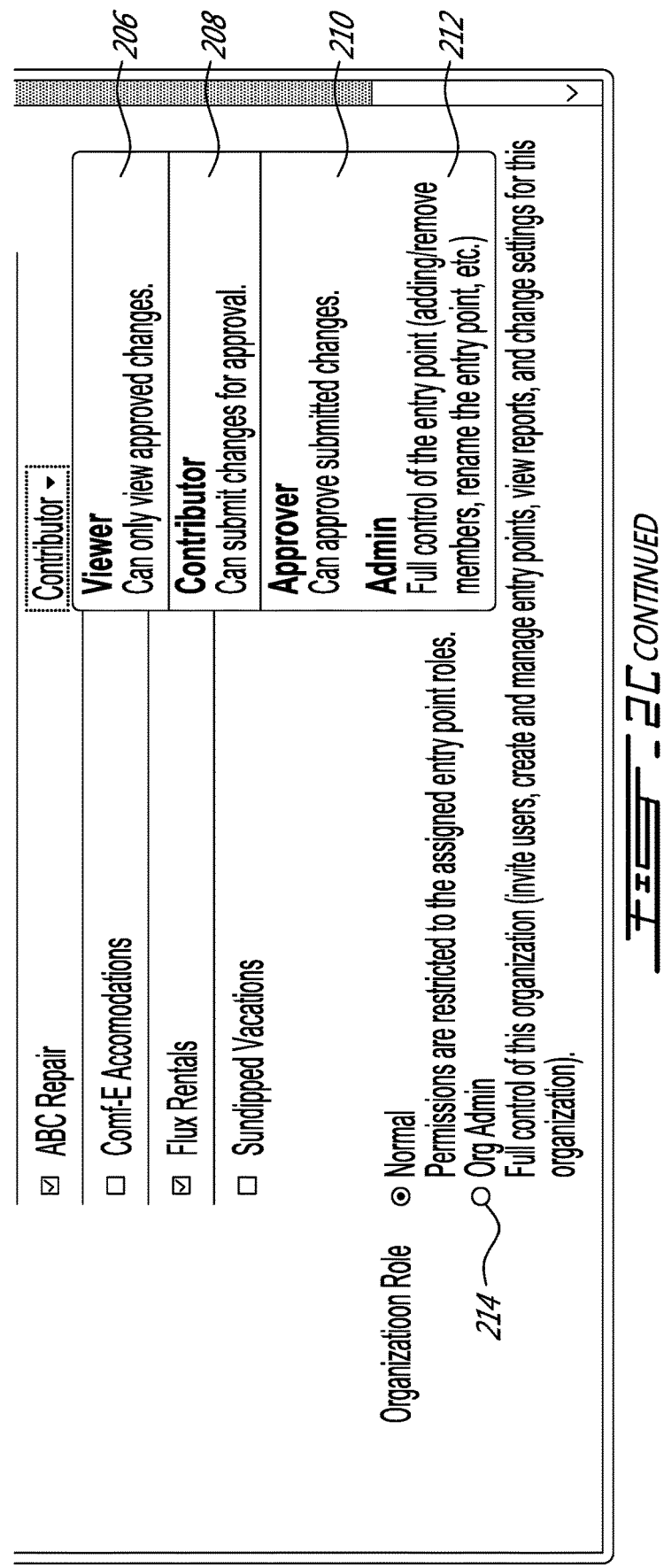

Procedure *Flow* | Flows | Approvals ⓪ | Administration | Help ⑦

Administration / Reports / Unreviewed Changes

ENTRY POINT
[Flux Rentals ▶]

| Name | Unreviewed Changes | |
|---|---|---|
| Flow Admin | 0 | View changes |
| Flow User | 0 | View changes |

Send Feedback · Blog · Help · Twitter · Facebook · © 2015 Innovatia Inc.

Procedure *Flow* | Flows | Approvals ⓪ | Previous Next | Options ▾ | Help ⓘ | Administration | ♤ Notifications | Flow Admin ▾

Administration / Reports / Unreviewed Changes / Flow Admin

ENTRY POINT

Flux Rentals ▶

Flow Admin has not reviewed 9 changes for Flux Rentals — 240

February 2015

Added example flows
Approved by Flow Admin on February 6 2015    View changes March 2015

Mod to verify
Approved by Flow Admin on March 9 2015    View changes

Changes to Flux Capacitor image and the like to improve readability, now in blue
Approved by Flow Admin on March 9 2015    View changes

OK, birthdate has been changed to birthyear
Approved by Flow Admin on March 9 2015    View changes

Minimum age is now 25 years
Approved by Flow Admin on March 9 2015    View changes

Vehicular not vehicle
Approved by Flow Admin on March 9 2015     View changes

Small mods
Approved by Flow Admin on March 9 2015     View changes

More small mods
Approved by Flow Admin on March 9 2015     View changes

Modifications
Approved by Flow Admin on March 9 2015     View changes

Send Feedback · Blog · Help · Twitter · Facebook · © 2015 Innovatia Inc.

FIG. 26 CONTINUED

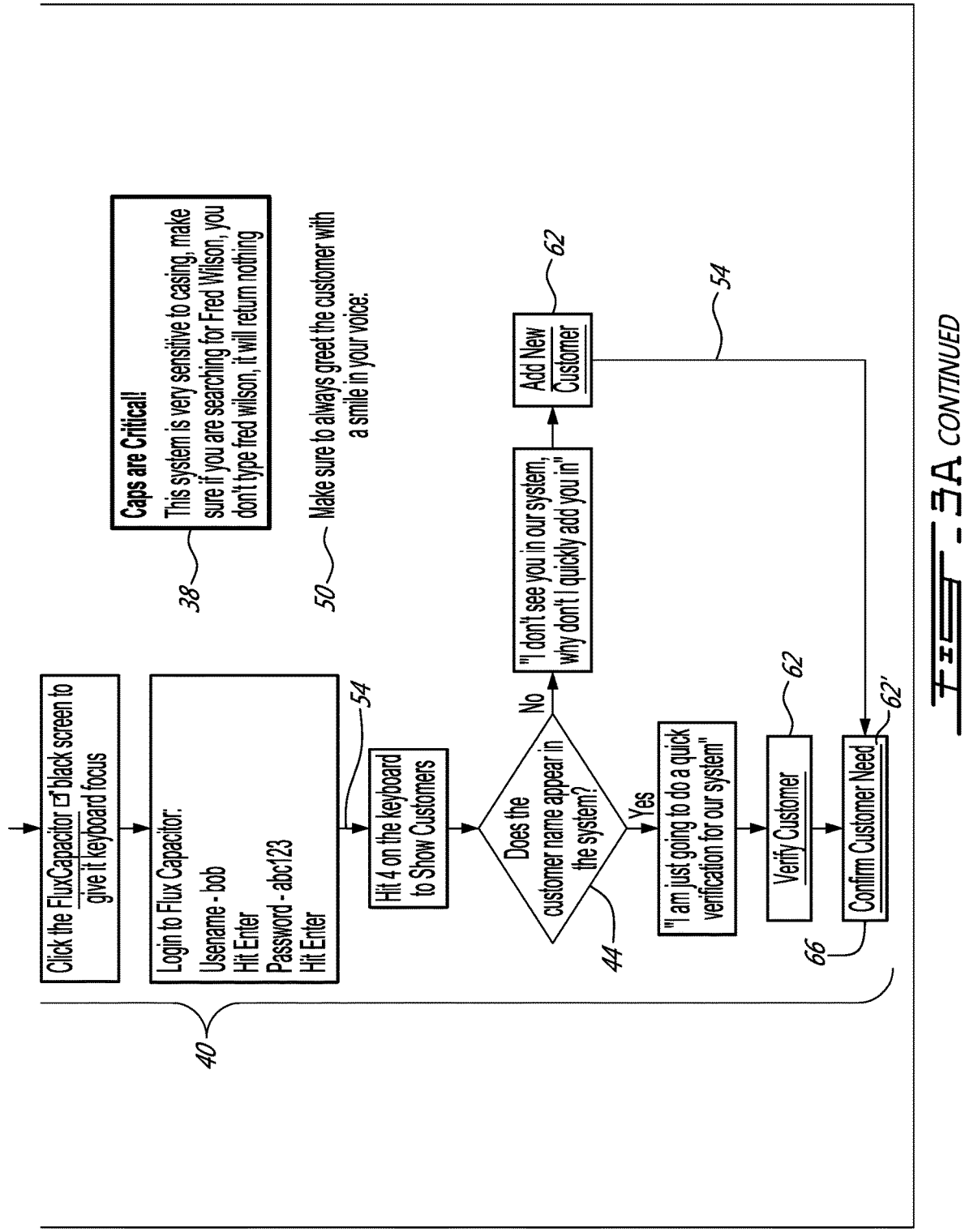

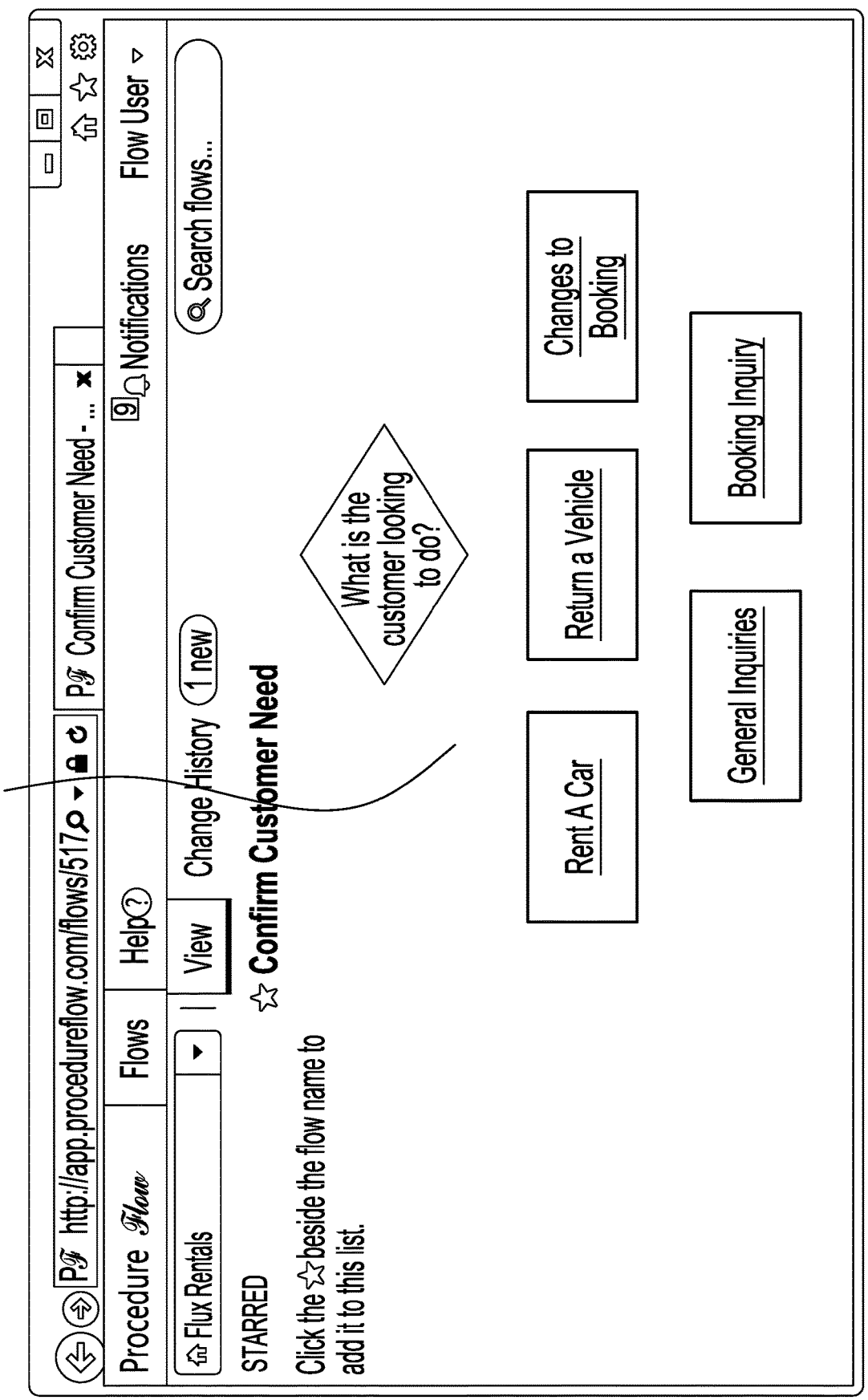

http://help.procedureflow.com/

Procedure *Flow* Help     Contact     Go to ProcedureFlow.com →

[Search]

Most Popular Articles

- What Do the Shapes and Colors Mean?
- The Spine
- Editing Flows
- What is ProcedureFlow?
- Contact Us
- Tables, Lists, Links and More
- Keep Flows Small
- Looping
- Pretty it Up!
- Mapping Keyboard Inputs

Getting Started
7 articles

Organization Admins
7 articles

Entry Point Admins
3 articles

Conventions
16 articles

Extras
2 articles

FIG - 5

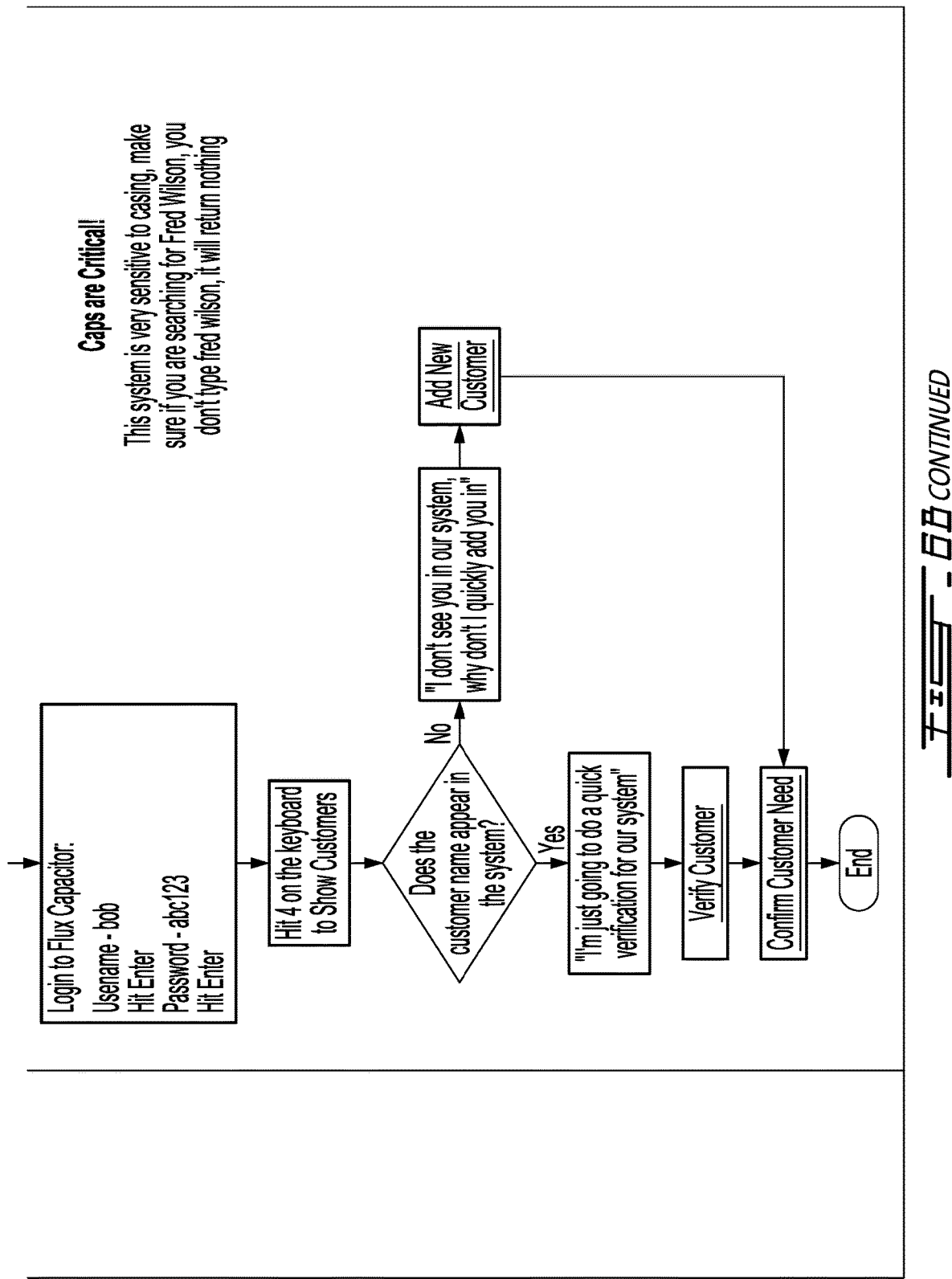

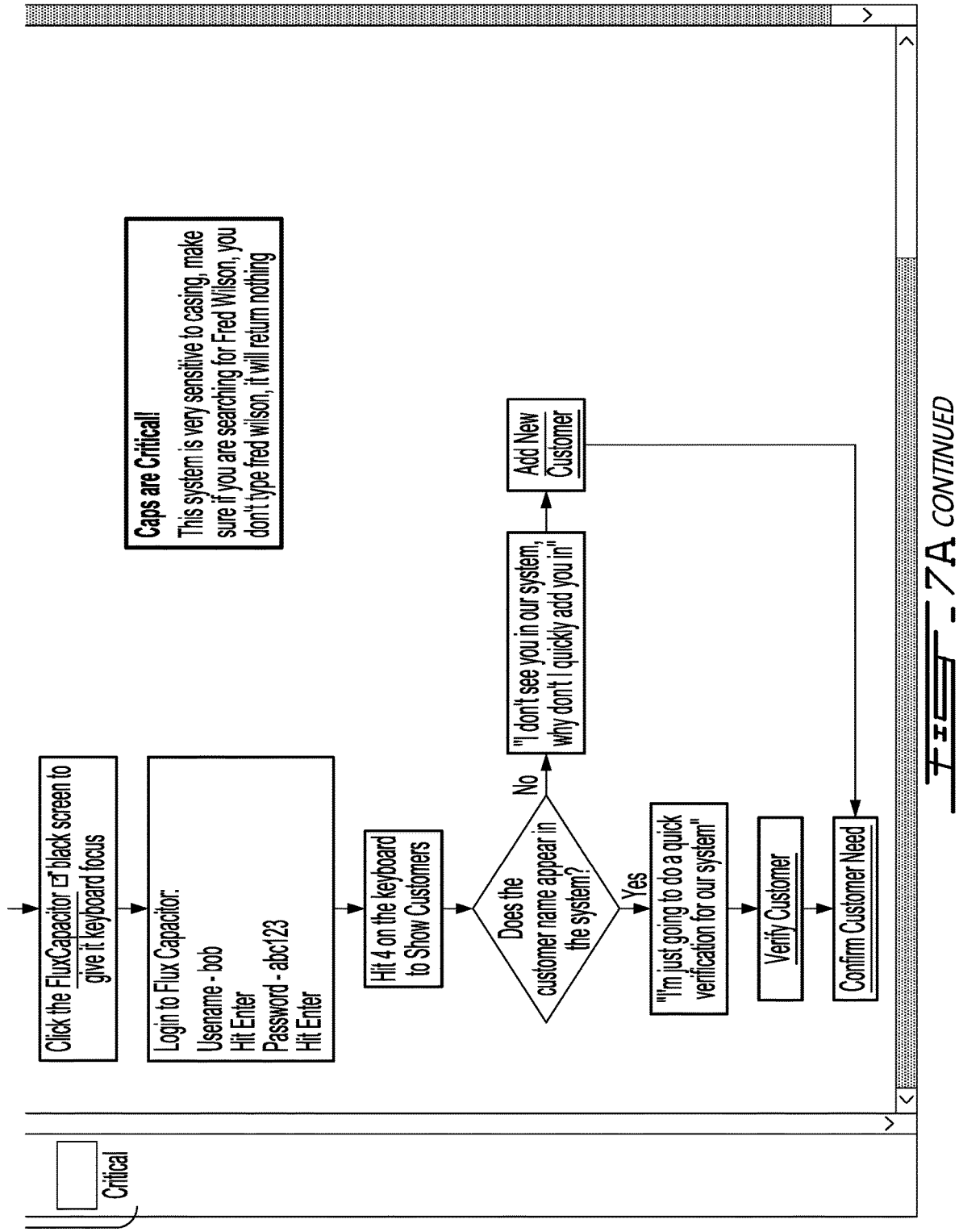

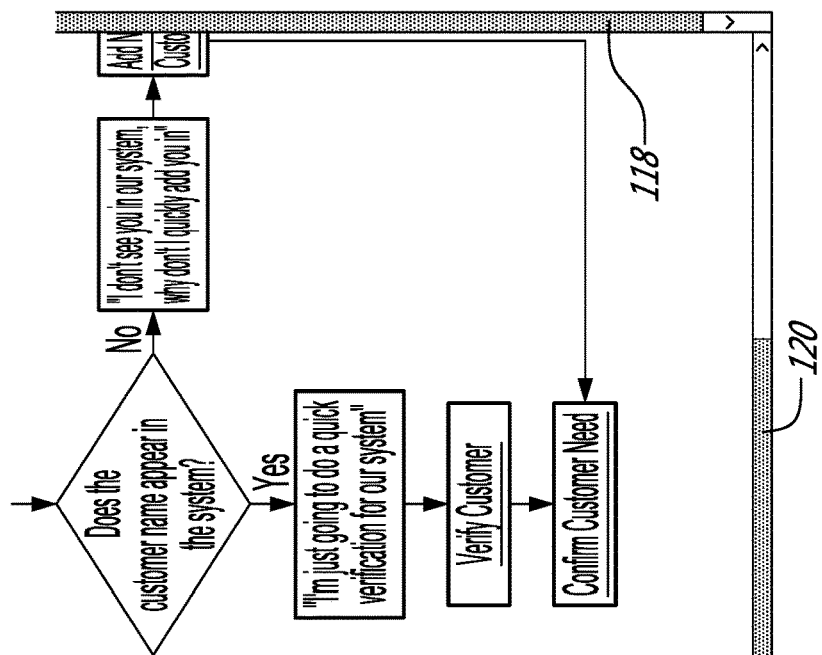
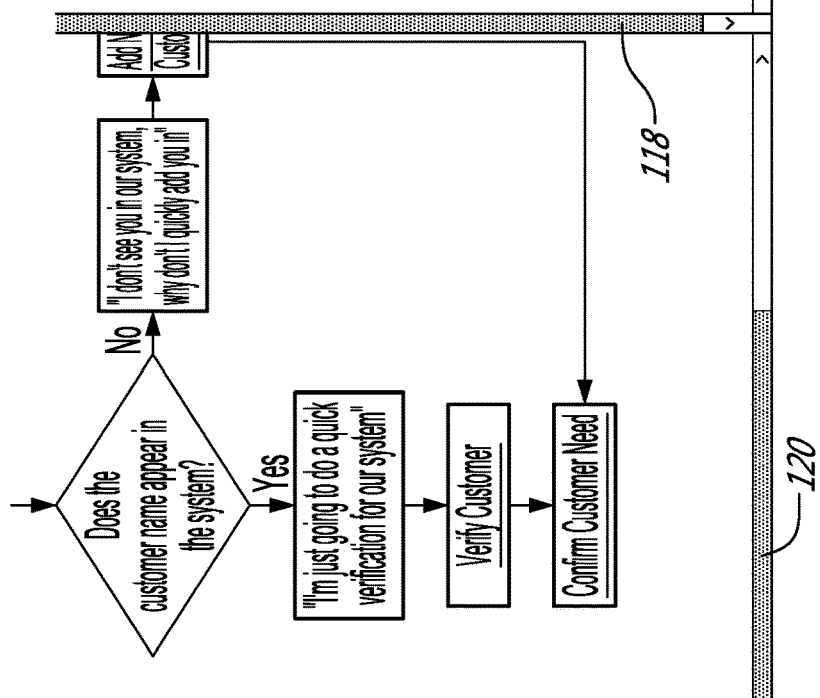
FIG. 7D CONTINUED

FIG. 7F

Navigating Tips
- Use numbers on the keyboard (ie: 1, 2, 3, 4) to dig deeper into menus
- Use ESC to go backwards
- Use Tab to move to the next field
- Use Shift+Tab to move back to a previous field

Caps are Critical!

Navigating Tips
- Use numbers on the keyboard (ie: 1, 2, 3, 4) to dig more deep into menus
- Use ESC to go backwards
- Use Tab to move to the next field
- Use Shift+Tab to move back to a previous field

Caps are Critical!

FIG. 7F CONTINUED

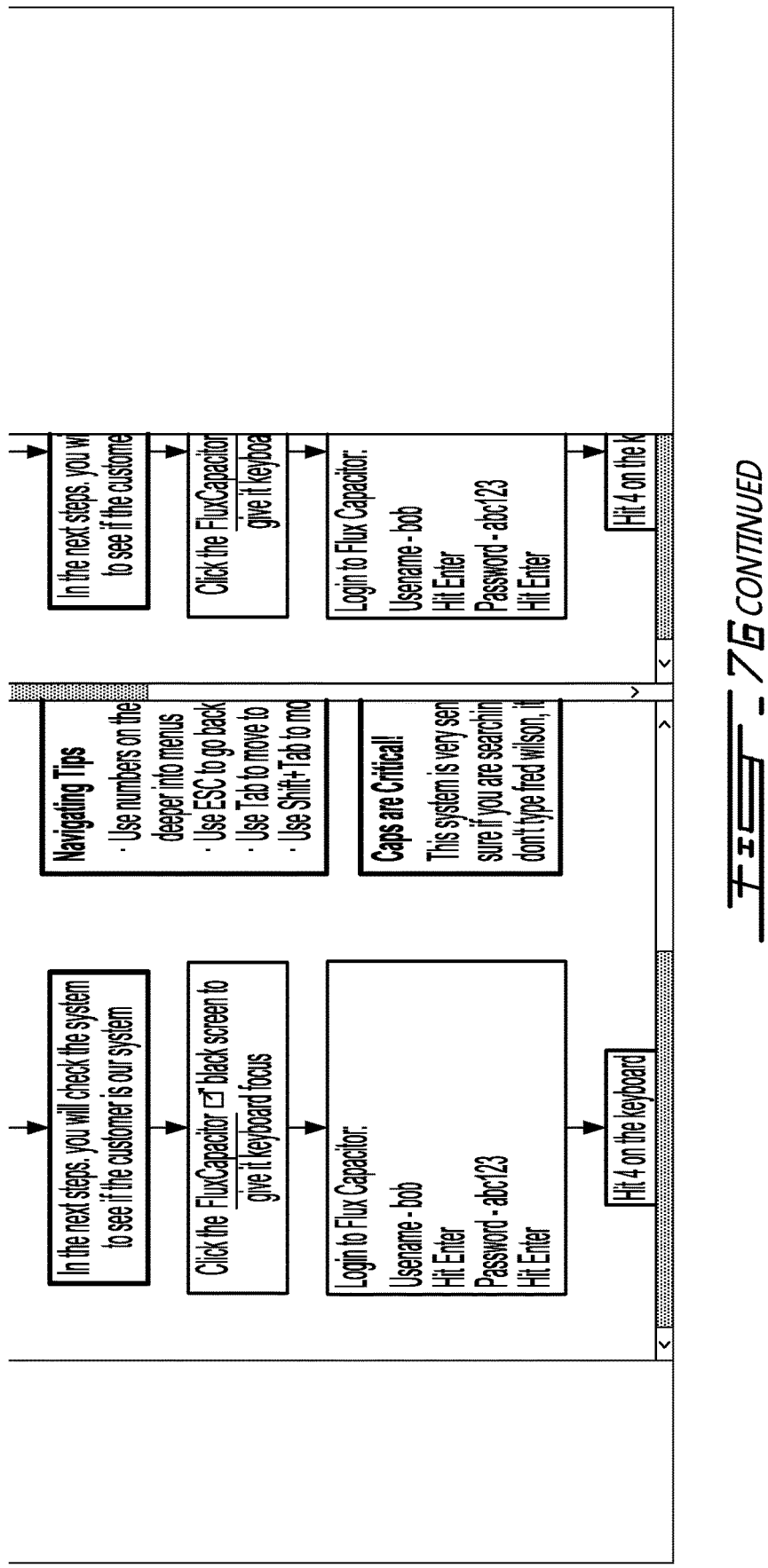

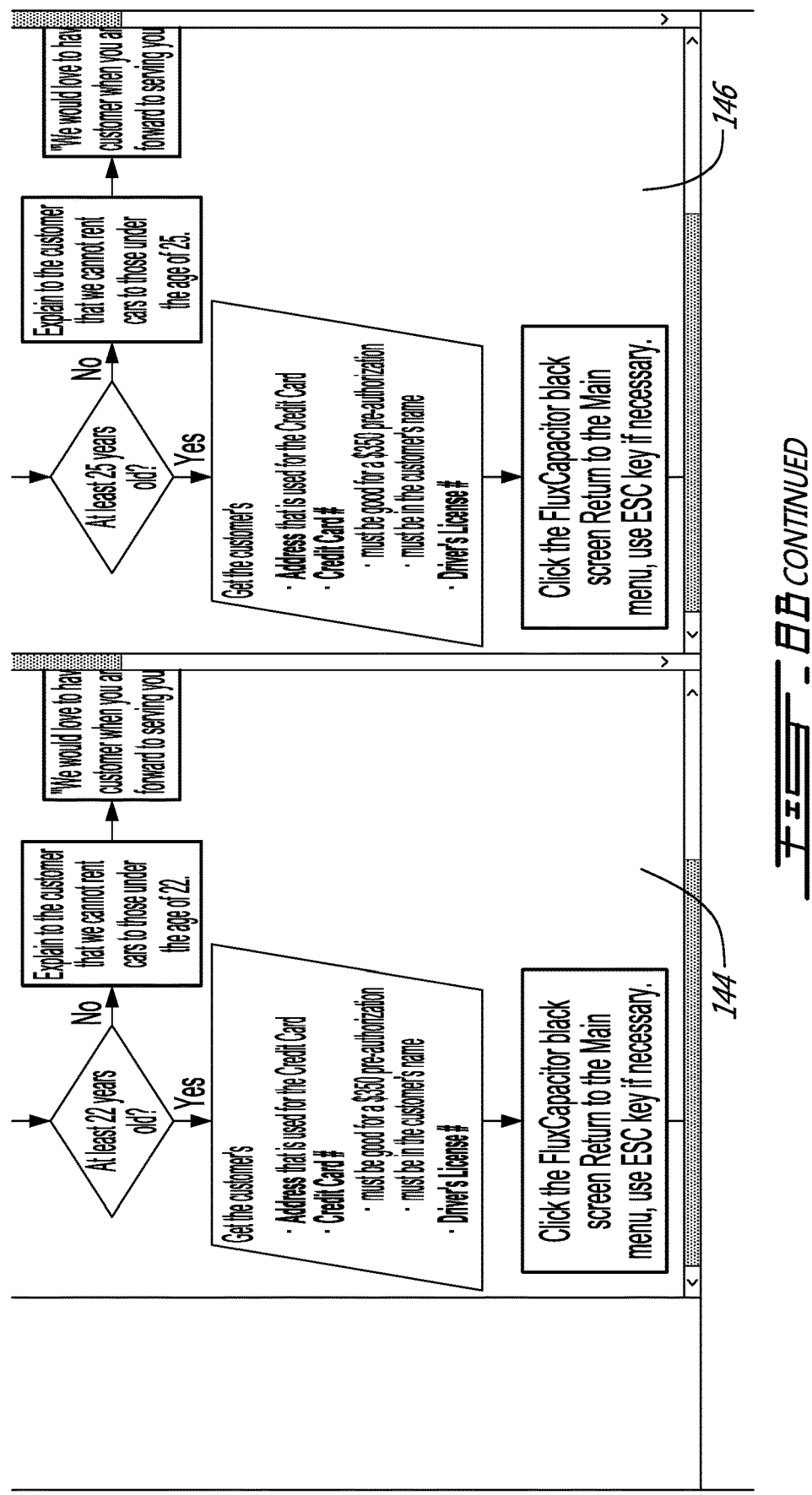

Change History

March 2015

[NEW] Minimum age is now 25 years
Create by Flow User. Approved by Flow Admin on March 9 2015.
View changes

[NEW] OK, birthdate has been changed to birthyear
Create by Flow User. Approved by Flow Admin on March 9 2015.
View changes

Changes to Flux Capacitor image and the like to improve readability, now in blue
Create by Flow User. Approved by Flow Admin on March 9 2015.
View changes

February 2015

Added example flows
Created by Micah Peterson. Approved by Micah Peterson on Febtuary 6 2015.
View changes

Created Flux Rentals
Automatically created. Automatically approved on February 6 2015.
View changes

P₮ http://app.procedureflow.com/approvals/3235 | P₮ Flux Image Change | Proce... ✕

Procedure *Flow* | Flows | Approvals ⓪ | Previous Next | 🖉 Options▼ | Administration | Help ⓘ | ◯ Notifications | Flow Admin ▽

← Back to approvals

Live is now ahead of this draft. Merge the new changes into this draft.

Pending Approval | Flux Image Change
Create by Hugh Mansfield for Flux Rentals. Last modified a minute ago.
[Approve....] [Request Changes...] [Decline...] | 💬 Discussion Merge live changes to see this draft.

FIG. 9A

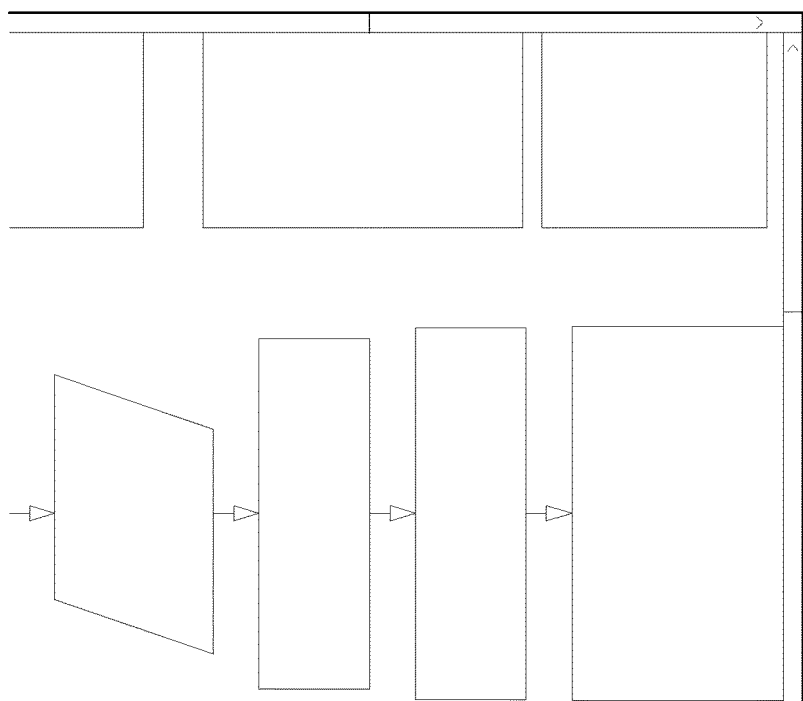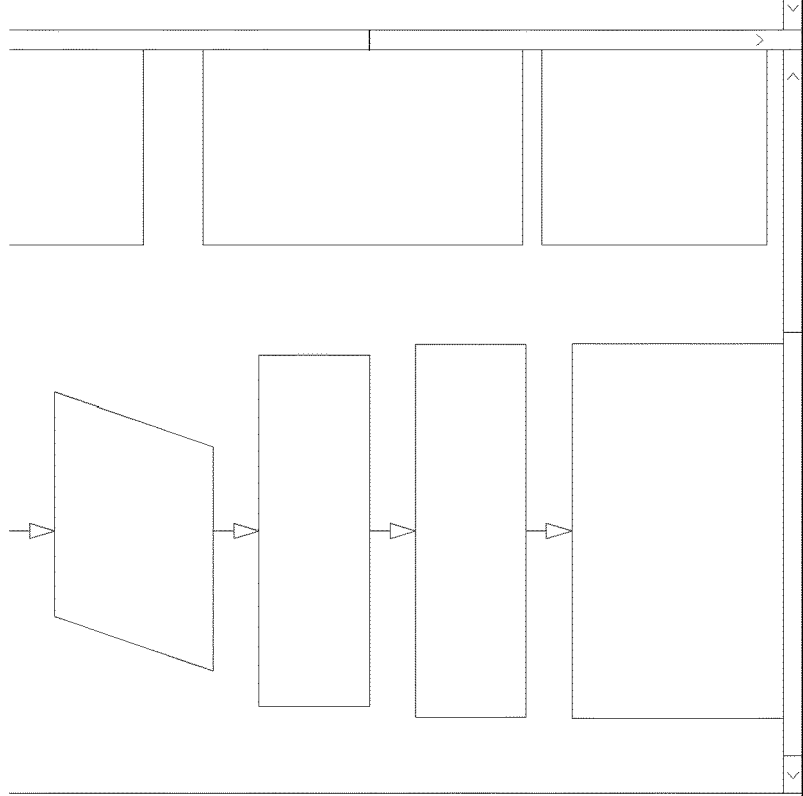
FIG. 9A CONTINUED

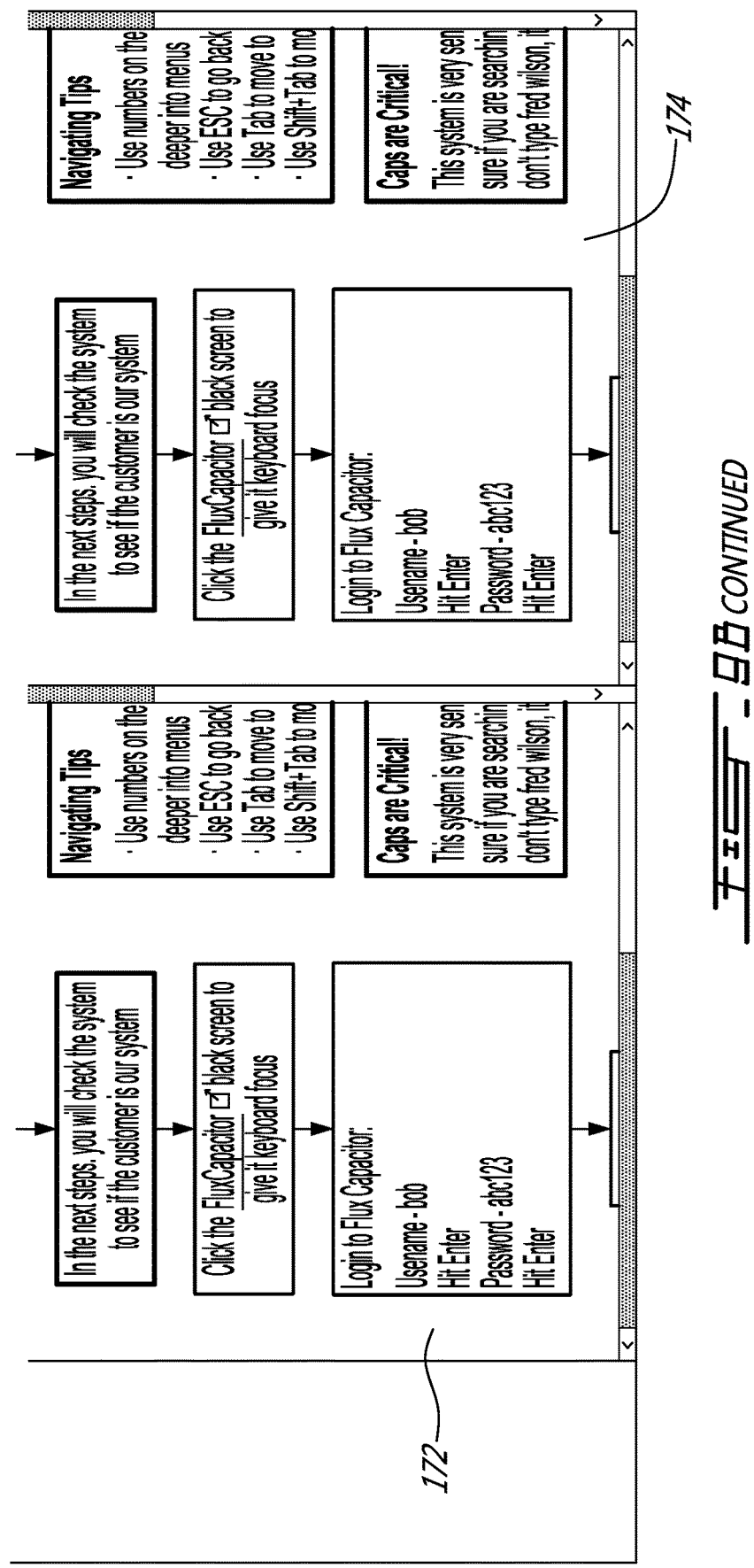

FIG. 9C

PROCEDURE FLOW ADMINISTRATION SYSTEM AND METHOD

CROSS REFERENCE TO RELATED APPLICATIONS

This application is a Divisional of U.S. application Ser. No. 14/877,968 filed on Oct. 8, 2015 which itself claims benefit of U.S. provisional application Ser. No. 62/132,874, filed on Mar. 13, 2015. All documents above are incorporated herein in their entirety by reference.

FIELD OF THE INVENTION

The present invention relates to a procedure flow administration system and method. In particular, the present invention relates to a system and method for modifying and approving modifications to procedure flows in a collaborative environment.

BACKGROUND TO THE INVENTION

Organizations typically introduce standardized operating procedures in order to improve efficiency in operations and control quality. This is especially necessary in large organizations where the size of the operation typically prohibits close supervision of more than a portion of the tasks by any one trusted individual, or in organizations having multiple offices at different locations, many or all of which may be involved at one point in a given procedure.

Traditionally, such standardized procedures are documented in an organization handbook or the like and are in a written form, and may include some descriptive tools such as flow charts or the like to aid the members of the organization in better understanding when a certain task should be performed, by whom and it's interrelationship with other tasks.

In order to improve the ease and efficiency of developing and enforcing standardized operating procedures, a number of tools have been developed. These tools are typically implemented in a networked environment to better leverage collaboration between those developing the operating procedures, simplify roll out and simplify the production of usage reports for audits and governance amongst other reasons.

These tools typically include a graphical user interface displaying a procedure flow chart or the like. One drawback of these tools, however, is that in more complex procedures the tool can typically only show a small portion of the procedure at any one time. One other drawback is that once a procedure is live and being used by the organization, it is difficult to modify the procedure and test modified versions of the procedure prior to their being released. This is especially true in a collaborative environment where more than one person may be attempting to introduce modifications at a given time.

SUMMARY OF THE INVENTION

The present invention overcomes the above and other drawbacks by providing a collaborative method between an editing user and a reviewing user different from the editing user, the method for editing and reviewing a live procedure flow comprising at least one decision step and at least one action step, wherein each of the at least one steps is interconnected with at least one other of said steps by at least one flow arrow indicating a direction of flow. The method comprises the editing user retrieving the live procedure flow from a repository and making a copy of the live procedure flow as a draft procedure flow, the editing user modifying the draft procedure flow by introducing modifications wherein the modifications comprise at least one of adding an additional decision step, adding an additional action step, modifying a text of the at least one decision step, modifying a text of the at least one action step, adding a flow arrow between two of the steps, rerouting one of the at least one flow arrows, storing said draft procedure flow in said repository and deleting at least one of the at least one flow arrows, the editing user displaying a graphical representation of the modified draft procedure flow and a graphical representation of the live procedure flow side by side on a display device of the editing user and highlighting the modifications in the graphical representation of the modified draft procedure flow, the editing user submitting the modified draft procedure flow to the reviewing user for one of approval and rejection, the reviewing user retrieving the modified draft procedure flow and the live procedure flow from said repository and displaying a graphical representation of the modified draft procedure flow and a graphical representation of the live procedure flow side by side on a display device of the reviewing user wherein the modifications are highlighted in both the graphical representation of the modified draft procedure flow and the graphical representation of the live procedure flow. The reviewing user one of approves of the modifications by replacing the live procedure flow in the repository with the modified draft procedure flow and rejects the modifications by notifying the editing user of the rejection.

There is also disclosed a method for displaying a live version and an edited version of a procedure flow on a display device, the procedure flow comprising a plurality of flow elements comprising a plurality of steps and at least one flow between the plurality of steps, the edited version comprising modifications to at least one of the elements, or both. The method comprises rendering a graphical representation of the edited version in a first display portion of the display and a graphical representation of the live version in a second display portion of the display, the second display horizontally adjacent the first portion, highlighting elements modified by the modifications in both the graphical representation of the edited version and the graphical representation of the live version, and synchronising the first display portion and the second display portion such that scrolling in one of the display portions causes a same scrolling in another of the display portions.

There is also disclosed a method of navigating between procedure flows of a given procedure. The method comprises rendering a graphical representation of a first procedure flow on a display, said first procedure flow comprising at least one action step comprised of a representative action step symbol and an action text describing an action to be taken during the step and at least one decision step comprised of a representative decision step symbol and a decision text describing a decision to be made during the step, wherein each step is interconnected with at least one other step by a flow arrow, wherein said first procedure flow details an order in which said at least one action step must be completed and said at least one decision step must be made in order to complete the given procedure; and associating a hyperlink with one of a first one of said at least one action step and a first one of said at least one decision step; and selecting said hyperlink. On selection of said hyperlink, a sub procedure flow referenced by said hyperlink is rendered on said display, said sub procedure flow comprised of at least one sub action step and at least one sub decision step, wherein each sub step is interconnected with at least one other sub step by a flow arrow and further wherein said sub procedure flow details an order in which said at least one sub action step must be completed and said at least one sub decision step must be made in order to complete said step from which said sub procedure flow is hyperlinked.

BRIEF DESCRIPTION OF THE DRAWINGS

FIG. 1 provides a schematic diagram of a procedure flow administration system in accordance with an illustrative embodiment of the present invention;

FIG. 2C provides an invite new user screen of a procedure flow administration system in accordance with an illustrative embodiment of the present invention;

FIG. 2D provides a view pending invitations screen of a procedure flow administration system in accordance with an illustrative embodiment of the present invention;

FIG. 2F provides an unreviewed changes screen of a procedure flow administration system in accordance with an illustrative embodiment of the present invention;

FIG. 2G provides a list of unreviewed changes screen of a procedure flow administration system in accordance with an illustrative embodiment of the present invention;

FIG. 3B provides a sub procedure flow viewer screen of a procedure flow administration system in accordance with an illustrative embodiment of the present invention;

FIG. 5 provides an online help screen of a procedure flow administration system in accordance with an illustrative embodiment of the present invention;

FIG. 7D provides a review screen in double pane mode for reviewing live versus edited procedure flows and detailing synchronised scrolling in accordance with an illustrative embodiment of the present invention;

FIGS. 7E and 7F provide respectively zoomed out and zoomed in review screens in double pane mode for reviewing live versus edited procedure flows in accordance with an illustrative embodiment of the present invention;

FIG. 8C provides a change history screen detailing changes to a procedure flow and their status in accordance with an illustrative embodiment of the present invention;

FIG. 8D provides a review screen in double pane mode for reviewing old live versus new live procedure flows in accordance with an illustrative embodiment of the present invention;

FIG. 9A provides a screen indicating that a user's draft is out of date in accordance with an illustrative embodiment of the present invention;

FIG. 9C provides an alternative screen shown to a user editing a procedure flow which has subsequently been the subject of approved modifications on behalf of another user and in accordance with an illustrative embodiment of the present invention.

DETAILED DESCRIPTION OF THE ILLUSTRATIVE EMBODIMENTS

Figure 2A:
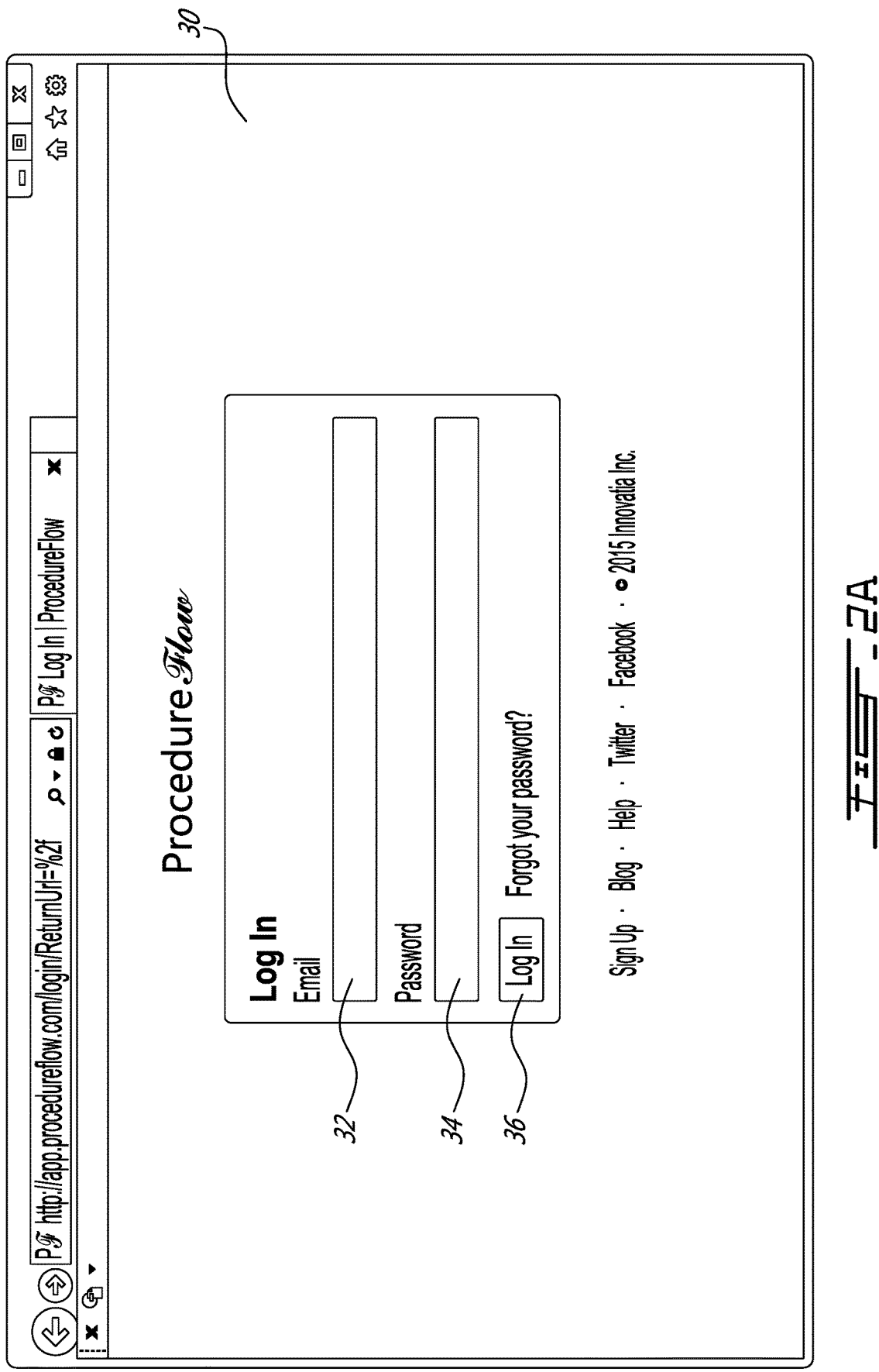
FIG. 2A provides a login screen of a procedure flow administration system in accordance with an illustrative embodiment of the present invention.

Referring now to FIG. 1, a procedure flow administration system, generally referred to using the reference numeral 10, will now be described. The server side 12 of the procedure flow administration system 10 comprises a load balancer 14 and one or more web-application servers 16 on which one or more procedure flow applications 18 are running and each which can access a data repository (SQL database server) 20. The user side 22 of the procedure flow administration system 10 comprises one or more client devices as in 24 which access the one or more web-application servers 16 remotely using a broadband network 26 such as the Internet. Each client device as in 24 comprises a web browser 28 which illustratively can receive, compile and display web pages to a user based on JavaScript™, HTML and style sheets (CSS) (all not shown) received from the web-application server(s) 16.

Referring now to FIG. 2A in addition to FIG. 1, a user at a client device 24 migrates to the address of the web server as in 16 using his web browser 28 and is initially displayed a login page 30, allowing the user to enter user credentials such as user name or email 32 and password 34 and gain access to the data servers 12 by selecting the login button 36. Illustratively a cookie (not shown) including the login information is stored on the client device which may be subsequently accessed by the web-application servers as 16 during subsequent logins. As will be discussed in more detail below, each user can be assigned varying rights which may be used to selectively limit a given user's access to particular features of the system, or the ability to create, amend and/or approve edited procedure flows.

Figure 3A:
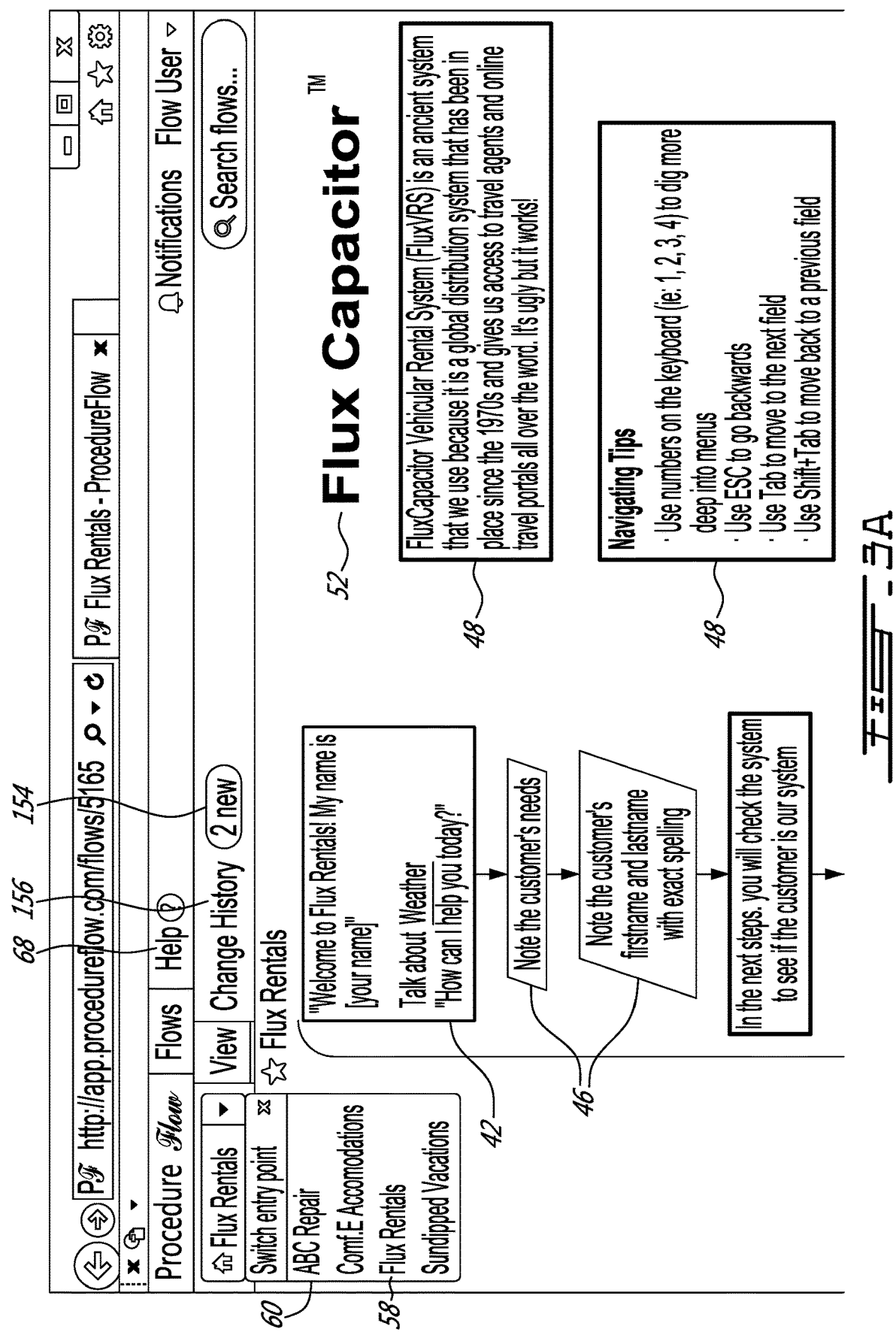
FIG. 3A provides a procedure flow viewer screen of a procedure flow administration system in accordance with an illustrative embodiment of the present invention.

Referring now to FIG. 3A in addition to FIG. 1, logging into the system 10 gains the client device 24 access to a procedure flow viewer 38. The procedure flow viewer 38 generally renders on the display a main procedure flow 40, i.e. a diagrammatic representation of a procedure flow, and for particular users may also provide tools, as will described in more detail below, for editing and approving edited procedure flows. Each procedure flow 40 is comprised of a variety of elements (or symbols) which represent steps in the procedure flow. Action steps 42 are represented by a rectangular box which is illustratively coloured blue and include descriptive text detailing the action to be taken by the user. Action steps 42 may also be coded to indicate actions which are critical, and must be completed, illustratively by colouring the Action step 42 red. Decision steps 44 are represented by a diamond which is illustratively coloured yellow and includes descriptive text detailing the decision to be made by the user. Data steps 46 are represented by a rhomboid which is illustratively coloured green. Data steps 46 include descriptive text indicating information which should be collected by the user during the step as the information is typically necessary in order to complete one or more of the subsequent steps. Backstory steps 48 are represented by a rectangle which is illustratively coloured purple. Backstory steps 48 provide, for example, textual indications as to why data is being collected, tips, and the like. Free form text boxes 50 can be included as well as images 52 to provide additional information and graphics to better enhance the user's experience when using the system 10, illustrations of usage, additional tips on data entry and the like. The various steps as in 40 are interconnected by flow arrows 54, typically presented as a solid line arrow, which indicate the order in which the procedure flow is intended to proceed and may include descriptive text, for example to indicate the flow arrow to be followed on exiting a decision step as in 44. Optional flow arrows, which indicate that a particular branch or spur of a procedure flow may be followed at the discretion of the user, are typically presented as a dashed line arrow.

Figure 4:
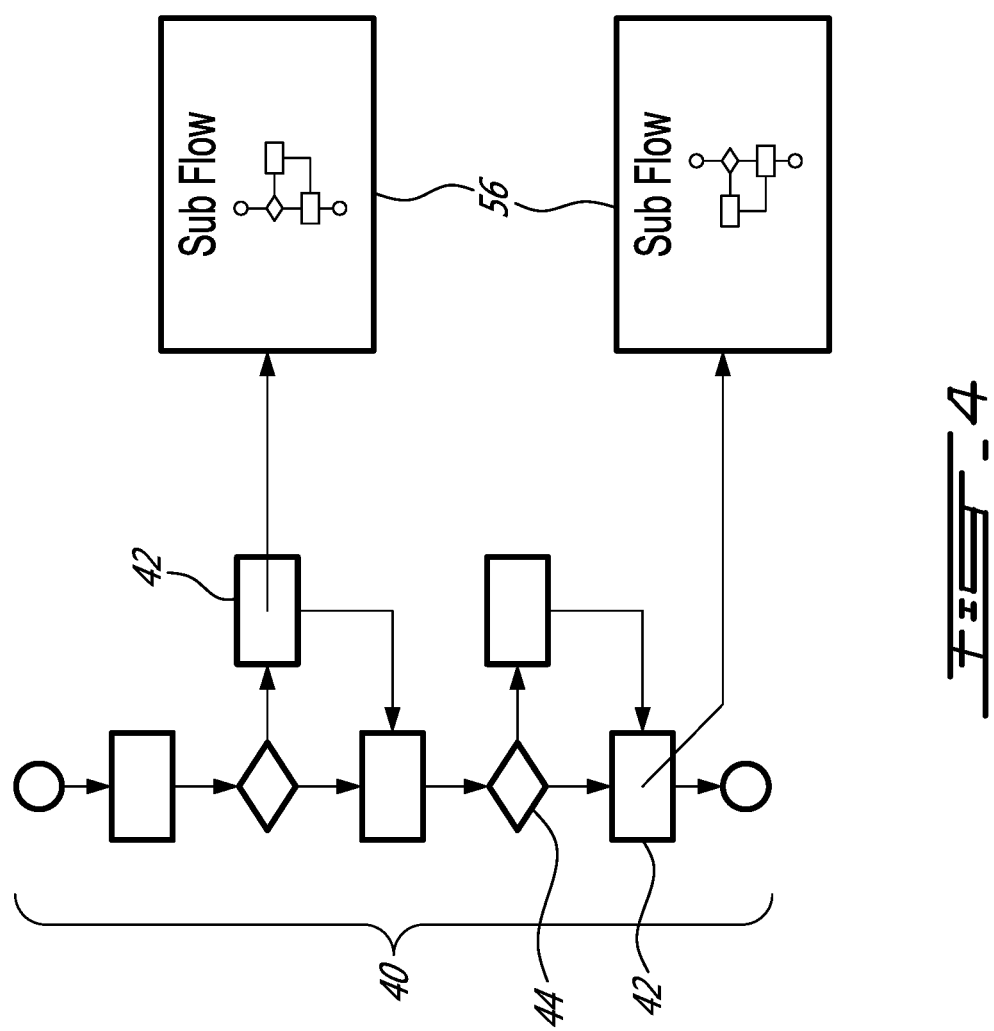
FIG. 4 provides a schematic diagram of main procedure flows and sub procedure flows of a procedure flow administration system in accordance with an illustrative embodiment of the present invention.

Referring now to FIG. 4, the procedure flow may include a main procedure flow 40 as described above and one or more sub procedure flows as in 56. As will be discussed in more detail below, the sub procedure flows as in 56 are accessed via sub procedure flow hyperlinks which are imbedded or anchored in the respective step as in 42, 44, etc. from which they depend. A sub procedure flow can provide additional Actions steps, Decision steps, Data steps, etc. and can also include additional Back story steps and free form descriptive text. Additional sub procedure flows may also be nested in sub procedure flows. In this manner a user, even for elaborate and detailed procedure flows, can be provided with a viewable series of steps at a given level, while also being able to view particular steps hyperlinked with a sub procedure flow in more detail. As will also be discussed below, this allows sub procedure flows to be modified or exchanged for other sub procedure flows without affecting the layout of the procedure flow from which it depends.

Referring back to FIG. 3A in addition to FIG. 4, procedure flows 40 and sub procedure flows 56 are typically laid out to the left of a view and such that about 80% of the action steps are arranged vertically in line, and such that they form the "spine" of the procedure flow. 20% of the steps typically extend away from the spine, and typically from a Decision step. This improves the readability of a given procedure flow and typically results in less cluttered procedure flow visual representations.

Still referring to FIG. 3A, during normal use a user logs onto the system and is displayed a top level procedure flow 40 associated with a default entry point. A different procedure flow may be selected by selecting a different entry point item 58 from the list displayed via the Switch Entry Point pull down menu 60. During completion of the procedure flow the user addresses each of the steps along the procedure flow. Sub procedure flows nested in (or which depend from) steps comprising sub procedure flow hyperlinks as in 62, which are illustratively anchored to the descriptive text in the step, may illustratively be accessed by selecting the sub procedure flow hyperlink which opens (displays) the sub procedure flow. For example, referring to FIG. 3B in addition to FIG. 3A, selecting a hyperlink 62' displays a sub procedure flow 64. The previous procedure flow can be returned to simply by selecting the back button on the web browser (or typically alt-left arrow on conventional web browsers). One benefit of using the back button as opposed to a hyperlink to return from a sub procedure flow to the procedure flow from which it depends is that the same procedure flow can be used for detailing more than one step. As a result a change in a sub procedure depending from one step is automatically reflected in all instances of that sub procedure, regardless of the step from which it depends. Referring back to FIG. 3A, on returning to the previous flow, the step associated with the sub flow being returned from is highlighted 66, for example using a characteristic colour such as a yellow, or the like.

Referring to FIG. 5 in addition to FIG. 3A, by selecting the help menu item 68, the user activates an online help system 70 which provides articles on various aspects of the system 10.

Figure 6A:
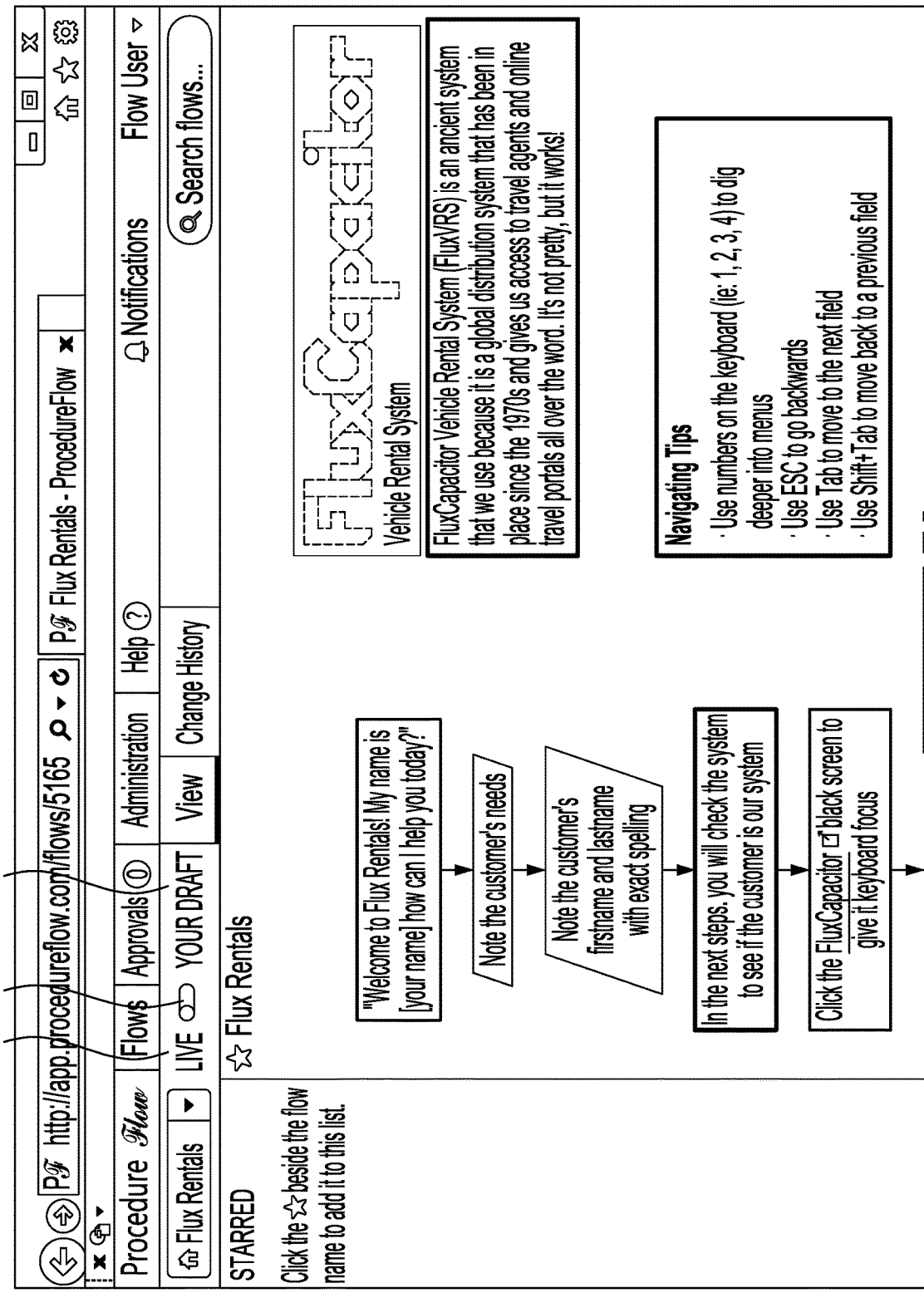
FIG. 6A provides a procedure flow viewer screen displaying a live procedure flow in accordance with an illustrative embodiment of the present invention.
Figure 6A:
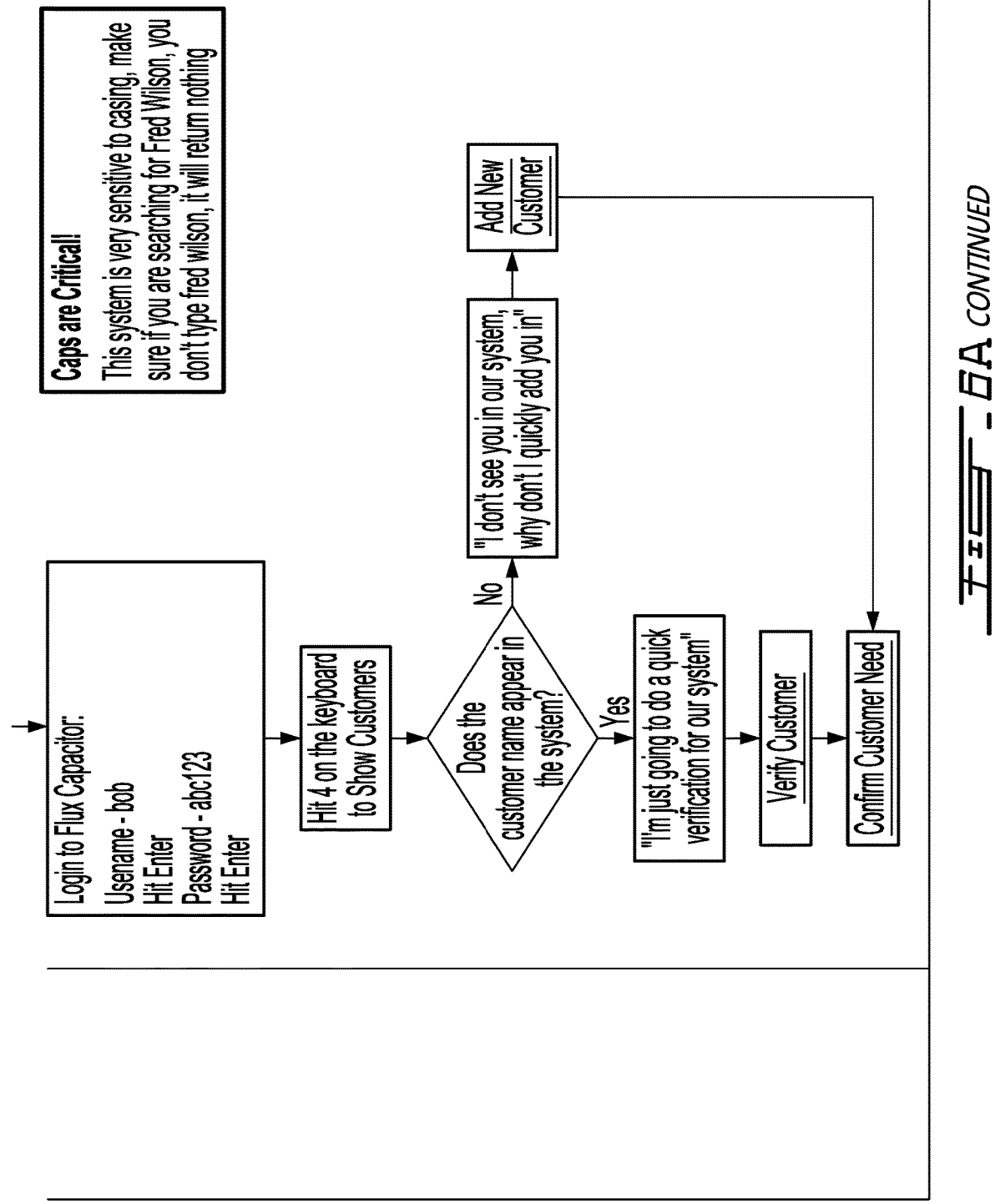

Referring now to FIG. 6A, depending on user access rights which are first established during the login procedure as discussed above in reference to FIG. 2A, and then re-evaluated for every request made by a client device to the system by reading login information from the cookie stored initially on the client device as in 24 and as discussed above, a particular user may be granted access to additional tools in order undertake additional operations with respect to the procedure flow 40. In particular, a toggle switch 72 is provided allowing the user to toggle between a live version 74 of the procedure flow 40 and the user's draft version 76 of the procedure flow 40, for example if the user is in the process of editing the procedure flow as will be discussed in more detail below.

Figure 6B:
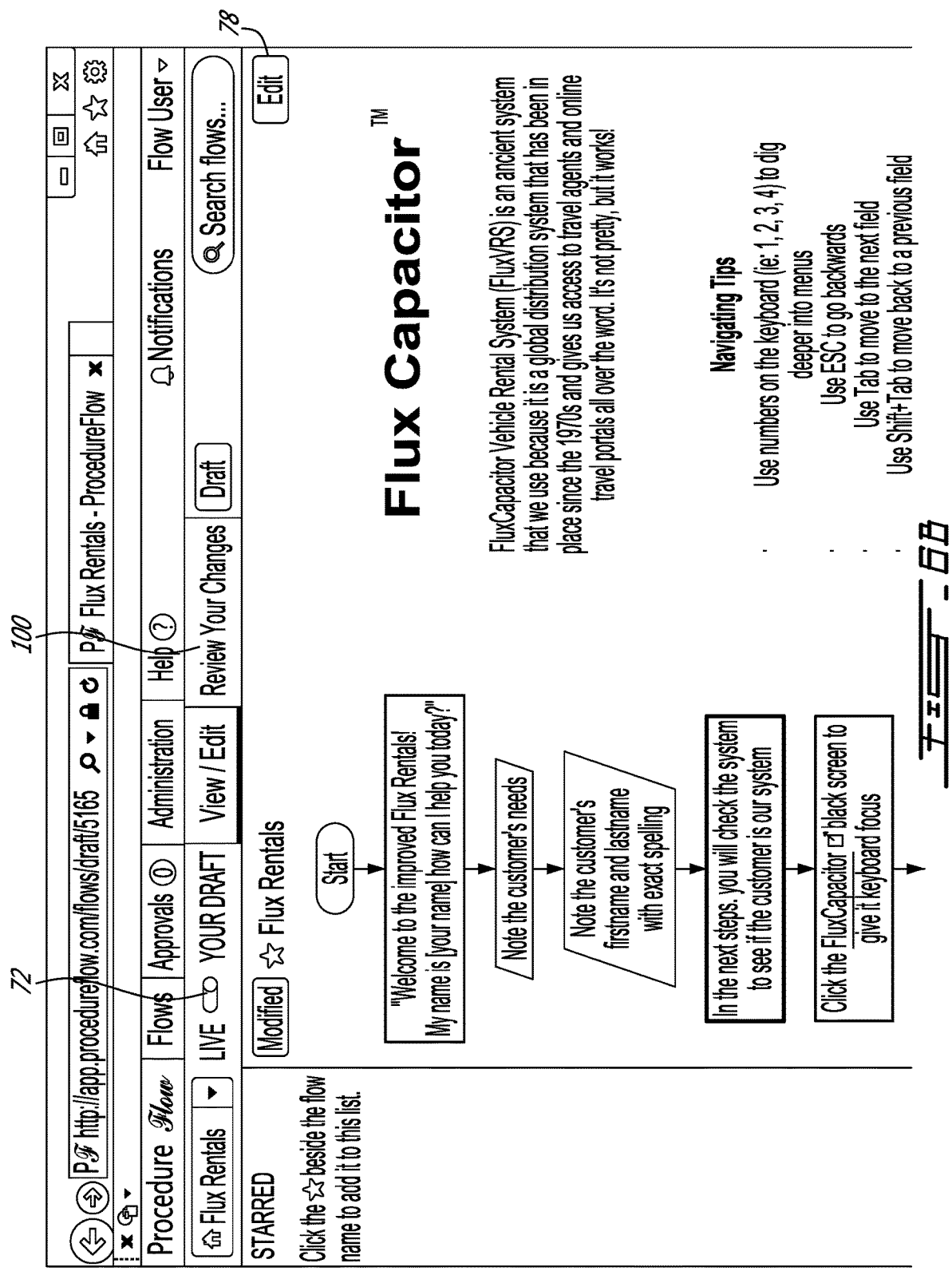
FIG. 6B provides a procedure flow viewer screen displaying an edited procedure flow in accordance with an illustrative embodiment of the present invention.

Referring to FIG. 6B in addition to FIG. 6A, moving the toggle switch 72 from "live" 74 to "draft" 76 invokes the display of the user's draft on the screen. The user can switch back and forth between the live and draft versions via the toggle switch 72. The draft version functions as the live version, and effectively represents how the draft version will look and operate when made live. If no draft version is available, for example if the live version represents the last draft version, then the live version is displayed as the draft version. The user can edit the draft version by selecting the edit button 78. In the event that no draft version is available, the current live version is copied and provides the basis for the draft version.

Figure 7A:
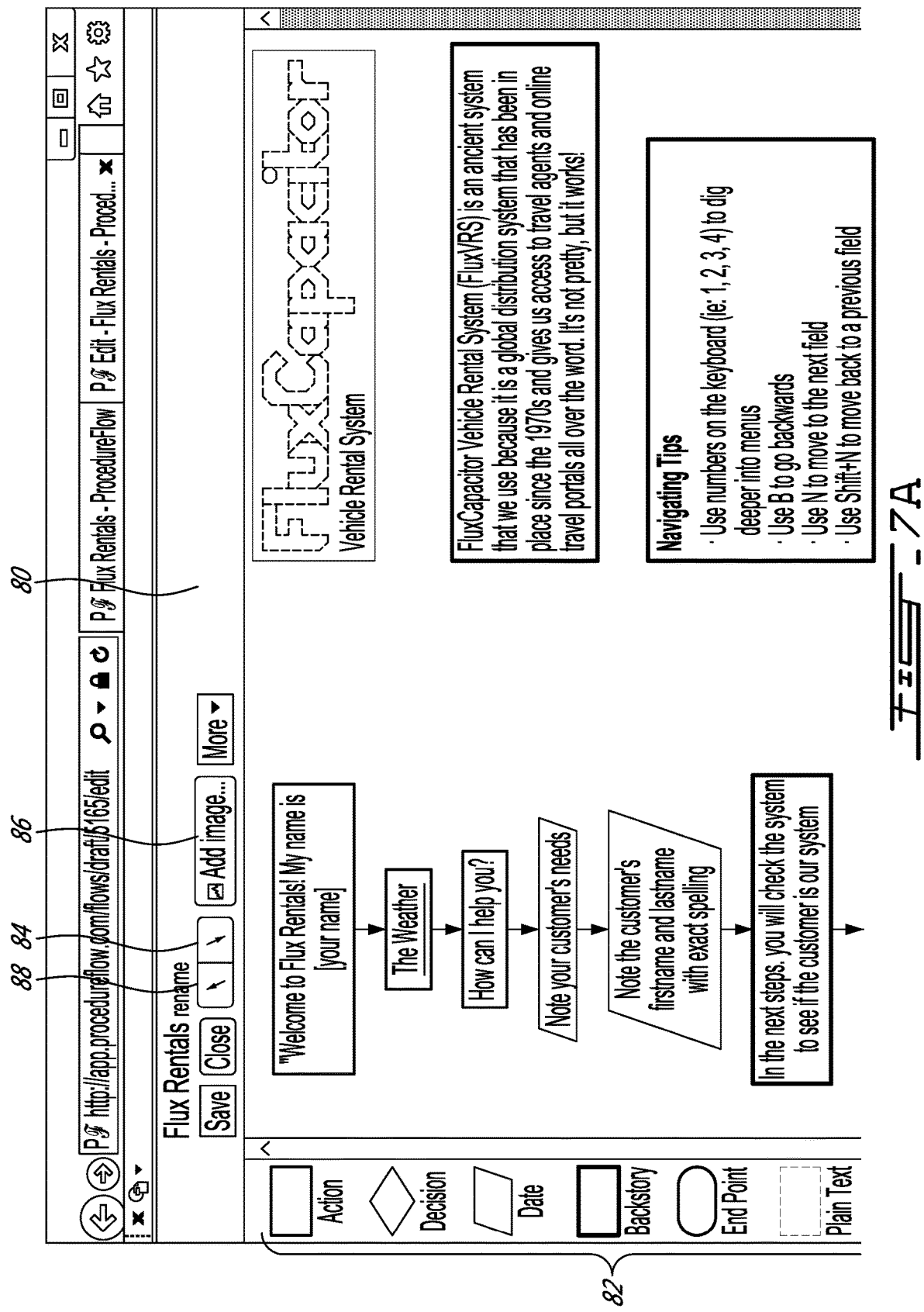
FIG. 7A provides an editor screen displaying a procedure flow being edited in accordance with an illustrative embodiment of the present invention.

Referring now to FIG. 7A in addition to FIG. 6B, as discussed above, the user can edit the draft version of the procedure flow 40 by selecting the edit button 78. Selecting the edit button 78 opens a new tab/window in the web browser and displays the draft procedure flow in an editing environment 80. The editing environment 80 includes a variety of tools, for example to add steps as in 82, to add links between steps 84, add images 86, select steps or links 88, delete selected steps and/or procedure flows, etc. As will now be understood by a person of ordinary skill in the art, using the tools the user can introduce changes to the procedure flow, for example by adding or deleting steps rearranging procedure flows between the steps and the like.

Referring now to 7B, in order to edit text items, for example the descriptive text of a step or link, the user double clicks on the respective step or link which opens a corresponding editing dialog box 90. Alternatively, the user can hover above the item to be edited and right click, opening a pop menu (not shown) via which the item can selected and coped, pasted, deleted, edited or moved to a different procedure flow. This same method may be used for multiple items which have been previously selected. Text may be entered or deleted via the editing dialog box 90. Formatting tools 92 are also provided for arranging and highlighting the text. In this regard, the tools generate a markup language syntax which conforms to Markdown and can be easily converted into HTML. A preview field is provided such that the marked up and formatted text may be viewed as it will be displayed to the user when live. The dialog box also comprises additional tabs which can be used to introduce popups 94, for example to provide additional useful information, and hyperlinks 96 to sub-procedure flows or web pages. Upon closing the editing dialog box 90, changes to the procedure flow can be saved by selecting the save button 98.

Figure 7B:
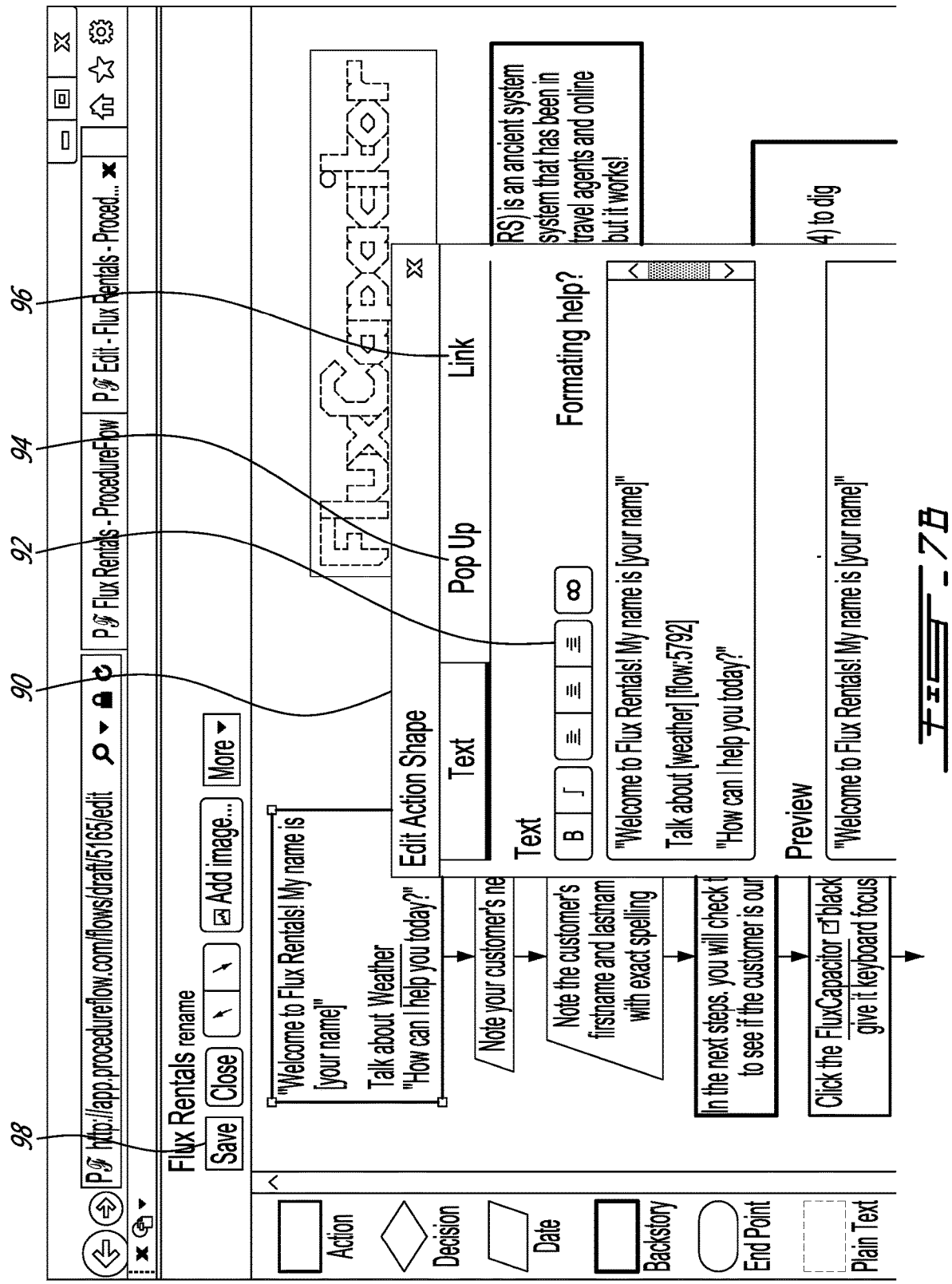
FIG. 7B provides an editor screen detailing modifying a text entry of a step of a procedure flow being edited in accordance with an illustrative embodiment of the present invention.
Figure 7B:
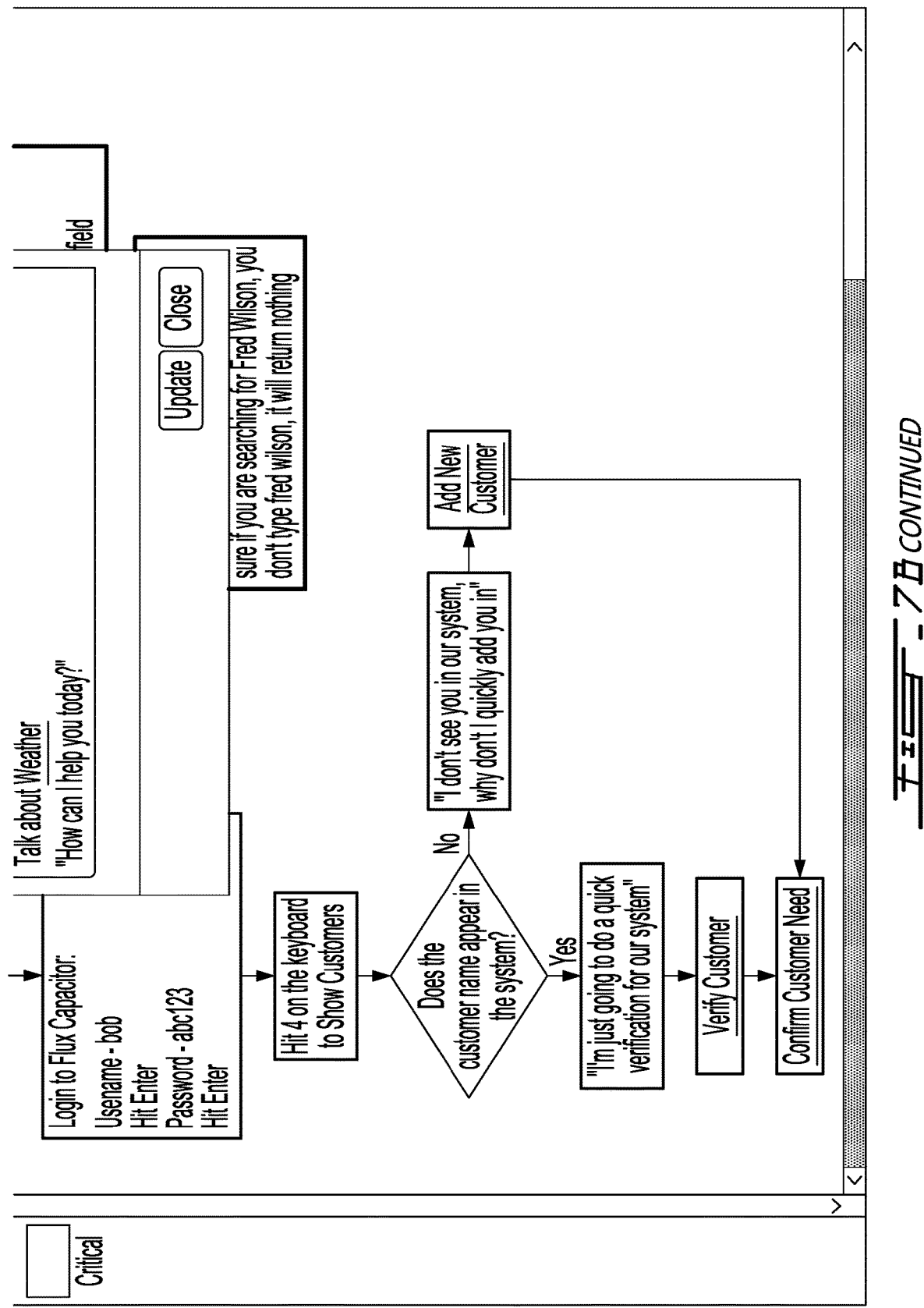

Referring back to FIG. 6B in addition to FIG. 7B, closing the editing environment returns the user to the draft view. Changes introduced via the editing environment can be viewed adjacent the live version by selecting the "Review Your Changes" menu item 100. Referring now to 7C, selecting the "Review Your Changes" menu item 100 provides display of the live version 102 of the procedure flow and the draft version 104 in a double pane mode in adjacent side-by-side panes as in 106. Steps that have been edited in the edited procedure flow are surrounded with a corresponding highlighting 108. Corresponding steps in the live procedure flow are also highlighted using a corresponding highlighting 110. Illustratively, for the edited procedure flow the steps are highlighted using a bold green outline while the corresponding steps in the live version are highlighted using a bold red outline. This greatly simplifies the comparison of edited and live versions, especially as is typically the case, when being reviewed by a third party approver who was not involved in the editing process. Of note is that more than one main procedure flow or sub procedure flow of a given entry point may be edited by a user. Additionally, new sub procedure flows may be added by introducing sub procedure flow hyperlinks as described above. A third pane 112 is used to display a list 114 of all edited (modified, added or deleted) procedure flows of the current entry point. A user may move between one or other of the procedure flows 116 in the list 114, for example by selecting one of the procedure flows 116. The group of edits to one or more procedure flows of a particular entry point which are carried out and, as will be discussed below, subsequently submitted together for approval are referred to generally as a "changeset".

Figure 7C:
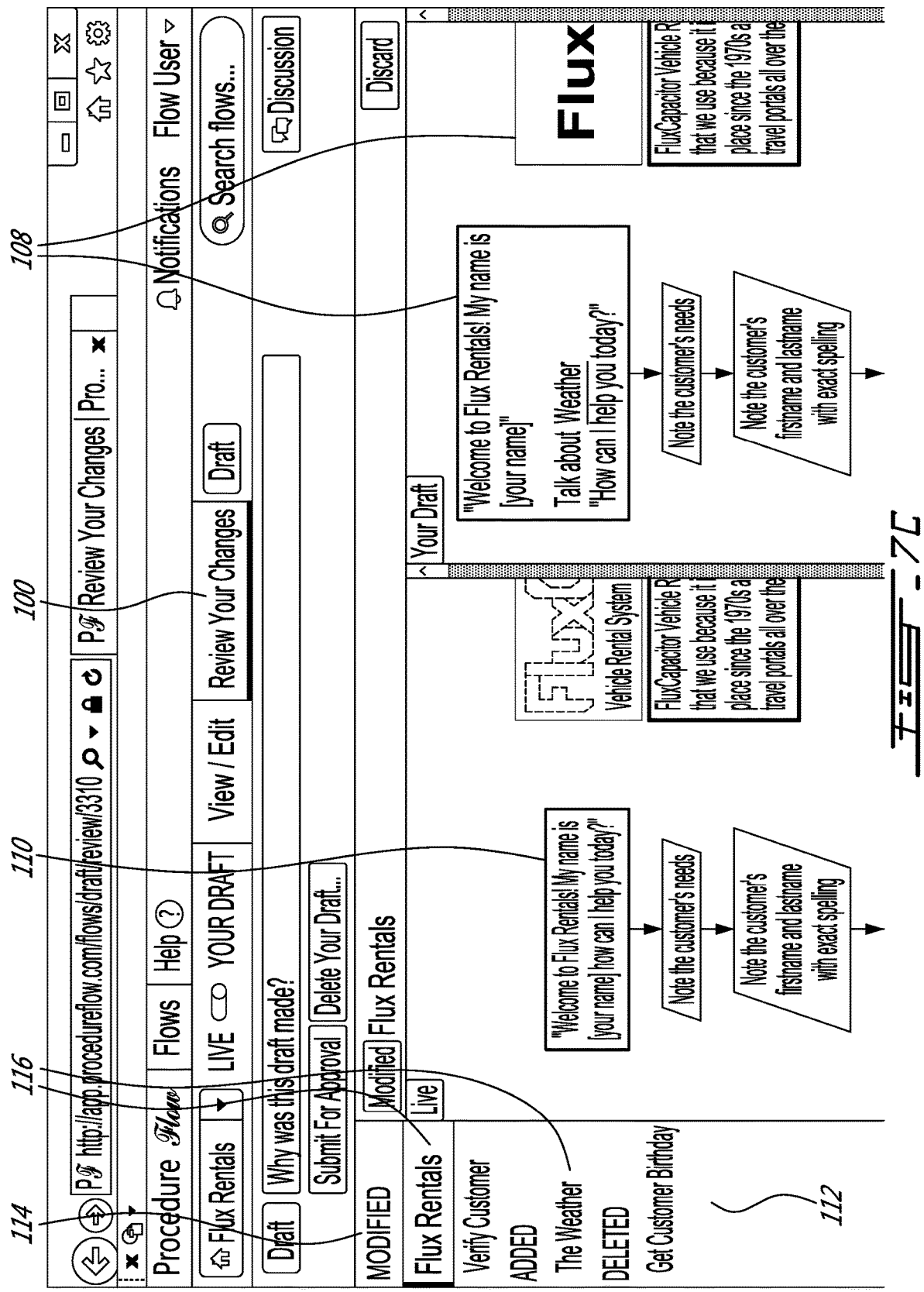
FIG. 7C provides a review screen in double pane mode for reviewing live versus edited procedure flows in accordance with an illustrative embodiment of the present invention.
Figure 7C:
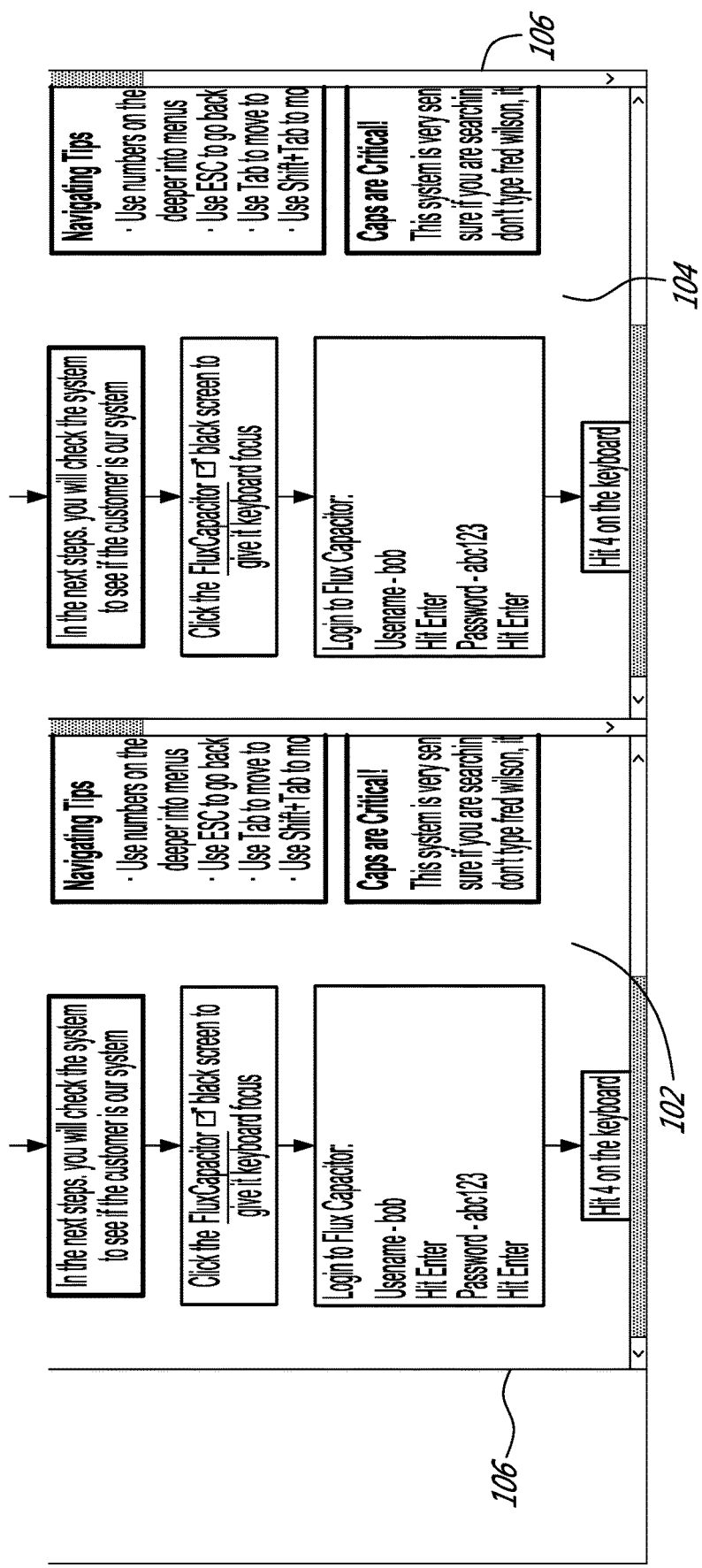
Figure 70:
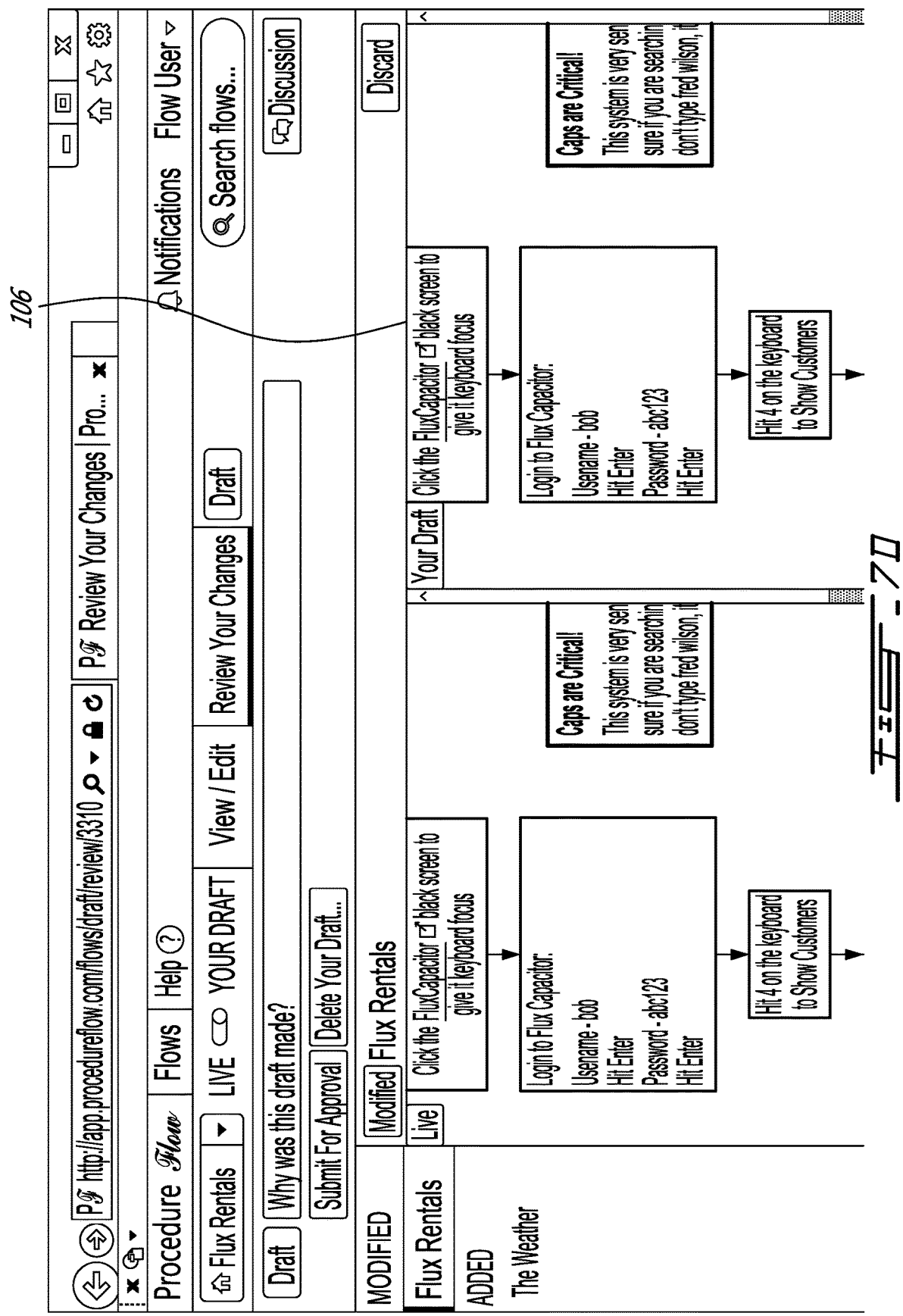
Figure 7E:
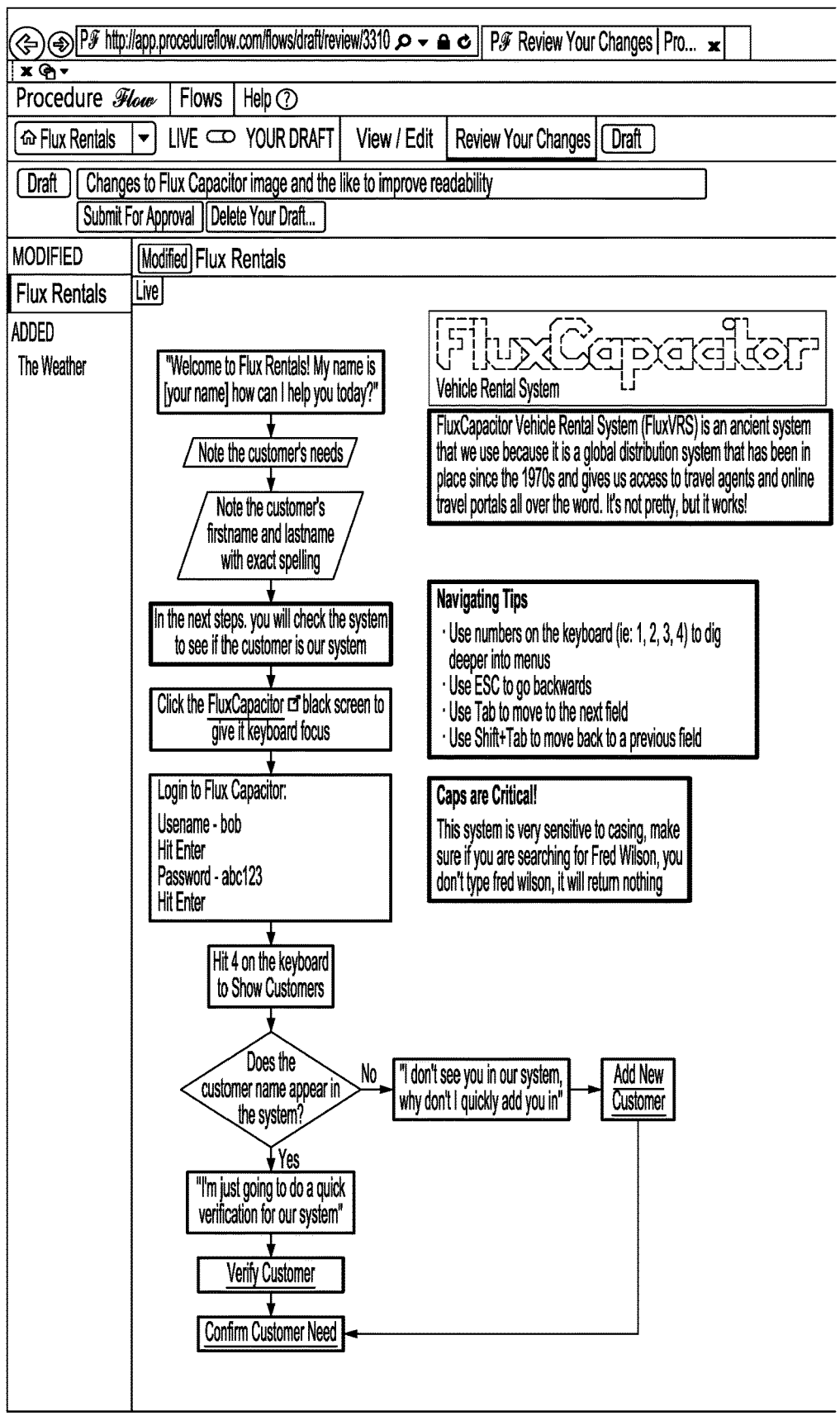
Figure 7E:
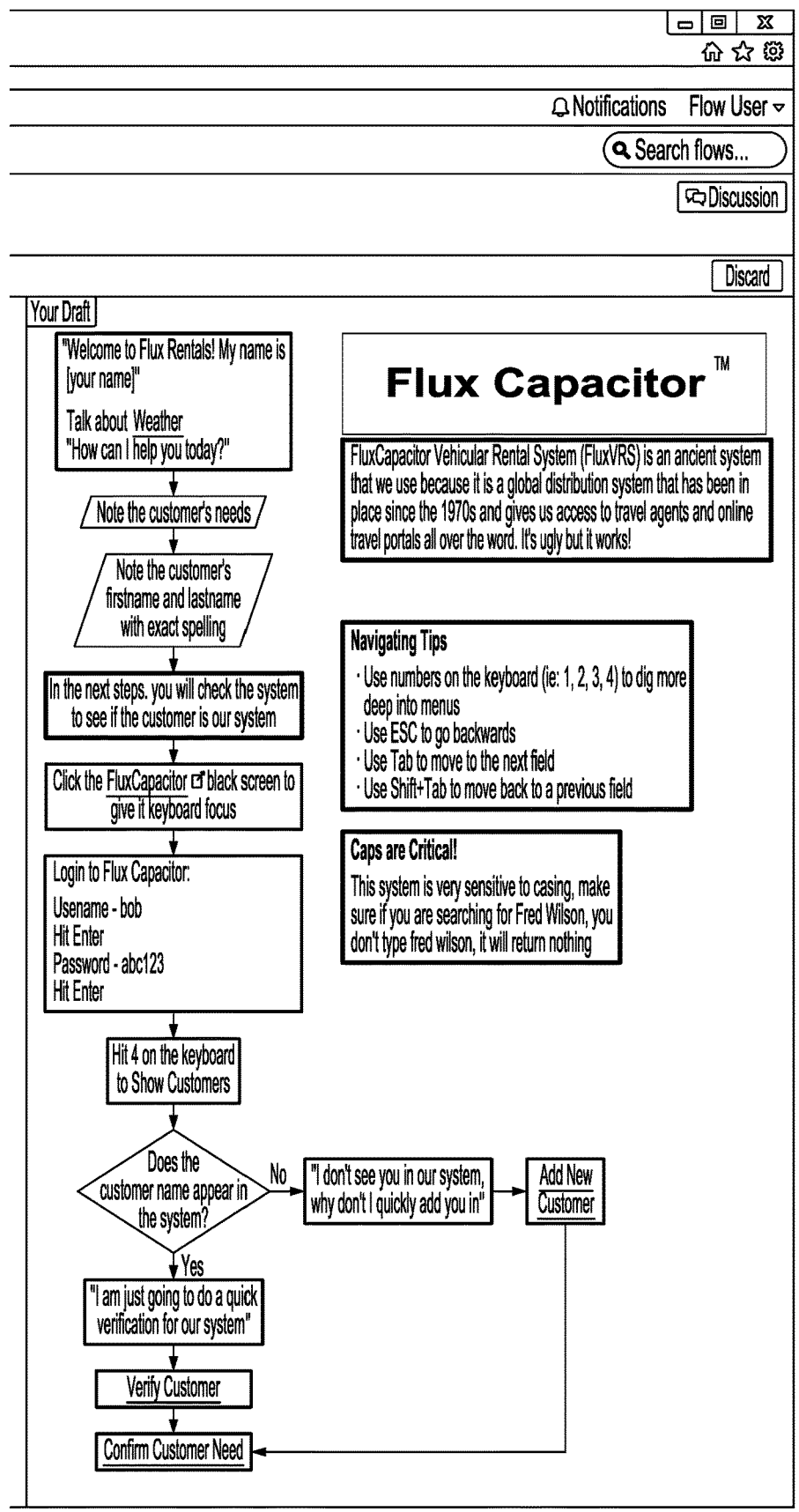
Figure 7F:
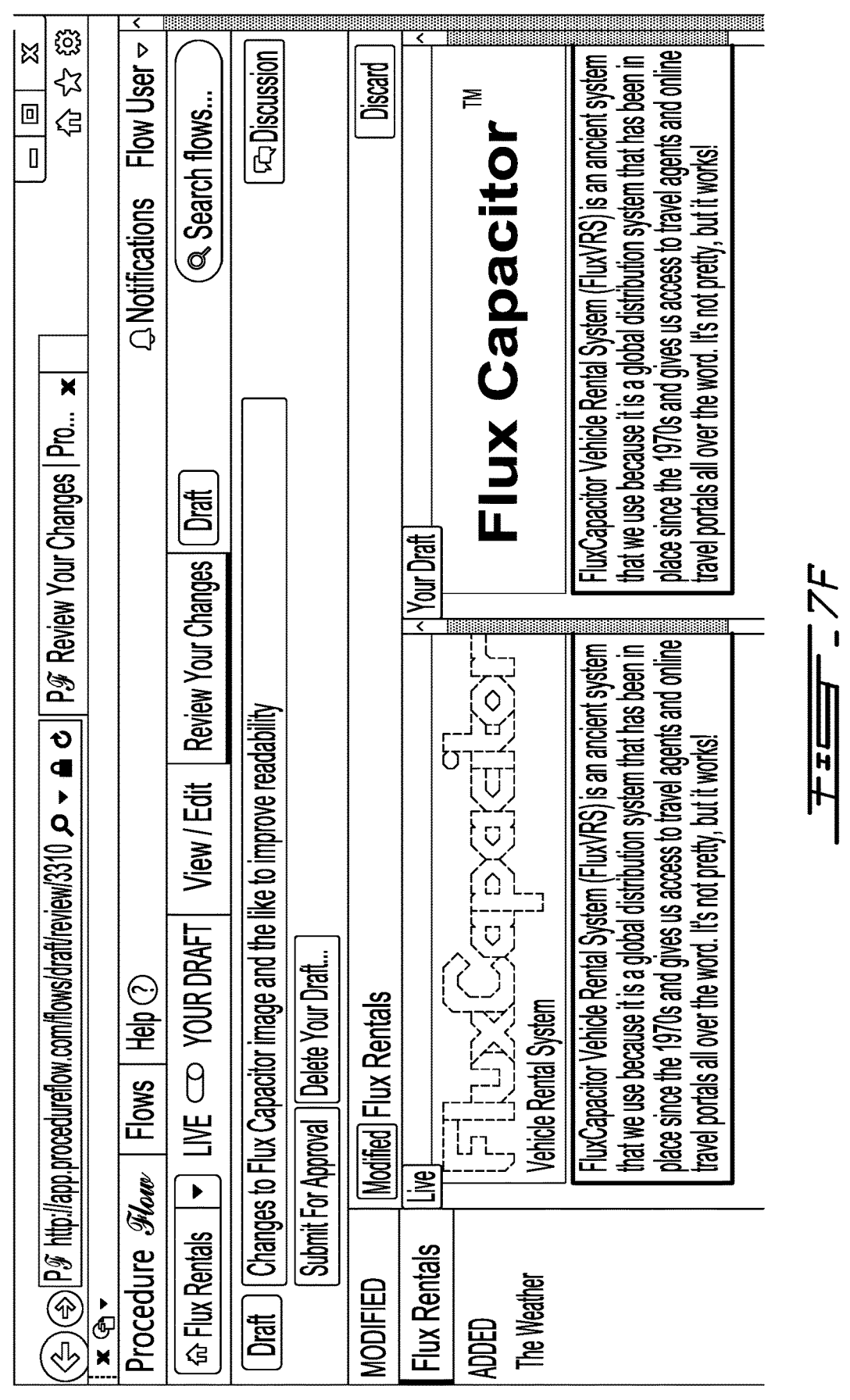

Referring now to FIG. 7D in addition to FIG. 7C, in the double pane mode quite large procedure flows can be viewed in their entirety by zooming out (for example by using Ctrl− to zoom out). This causes a similar and simultaneous zooming out of both panes as in 106 (as illustrated in FIG. 7E). Similarly, detailed portions of a view may be examined zooming in (for example by using Ctrl+ to zoom in) which gives rise to a similar and simultaneous zooming in of both panes as in 106 (as illustrated in FIG. 7F). Additionally, as in complicated implementations the procedure flows can be large, and therefore typically difficult to display legibly in their entirely on the display, the displays are also synchronized such that not only do they zoom in and out in a synchronized fashion, but also such that scrolling one display causes a similar scrolling in the adjacent display. Scrolling can be actuated either via one of the vertical slider/scroll bars as in 118 or one of the horizontal slider/scroll bars 120, vertically via, for example, a scroll button on a mouse (both not shown) or other input device, or vertically or horizontally by moving an activated cursor (also not shown) to a respective edge of the display. This allows the user to advantageously focus on steps of procedure flows which have been modified.

Figure 7G:
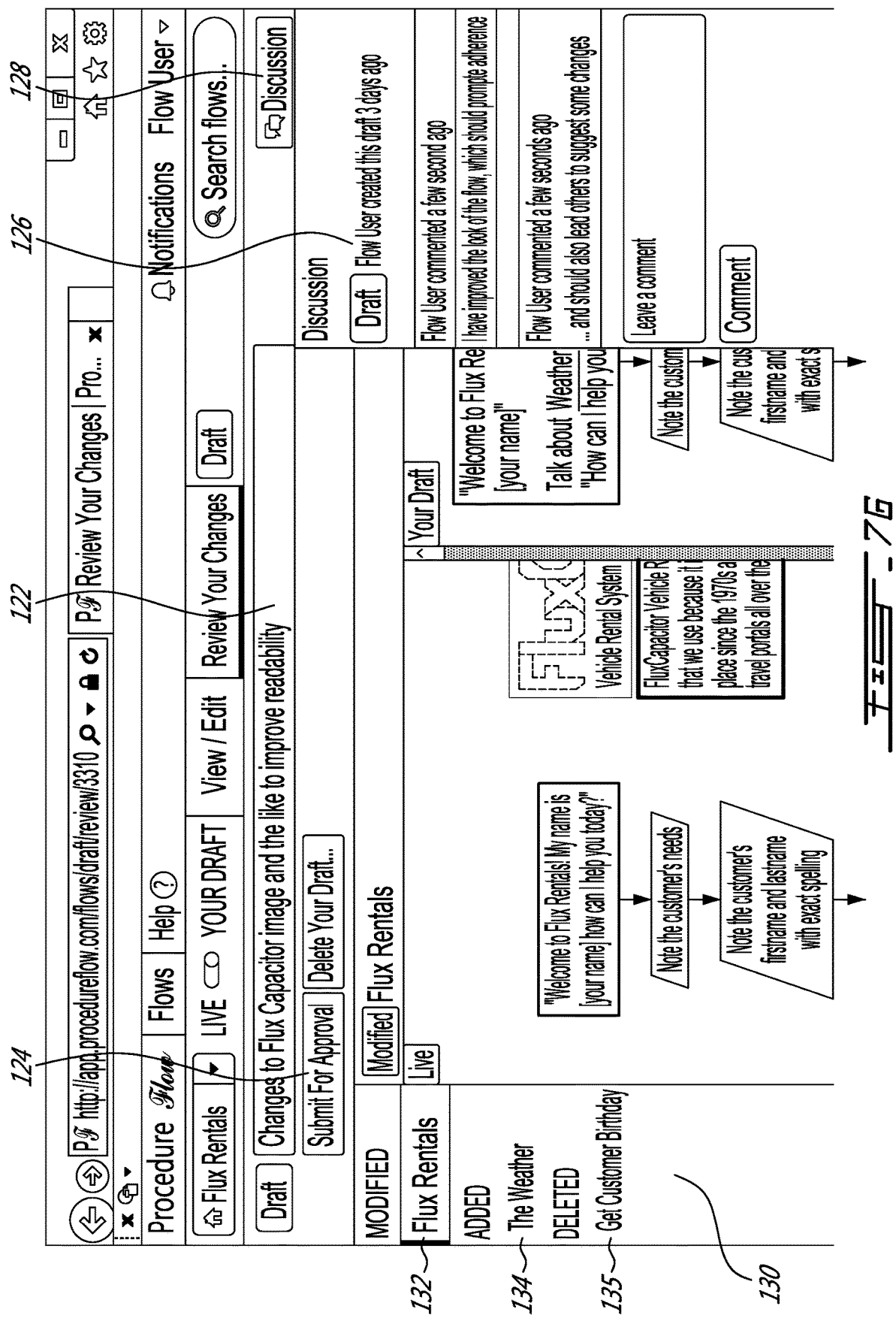
FIG. 7G provides a review screen in double pane mode for reviewing live versus edited procedure flows and detailing discussions appended to the procedure flow in accordance with an illustrative embodiment of the present invention.

Referring now to FIG. 7G, a user can submit a changeset for approval by indicating the reason the draft was undertaken in a Reason text box 122 and selecting a Submit for Approval button 124. Comments can also be appended to the draft amended procedure flow in a Discussion dialog box 126 which is opened by selecting a Discussion button 128. Of note is that a third pane 130 showing the changeset is also presented providing a brief indication of which procedure flows have been modified 132 during the edit, if any new procedure flows have been added 134 and if any existing procedure flows have been deleted 135.

Figure 8A:
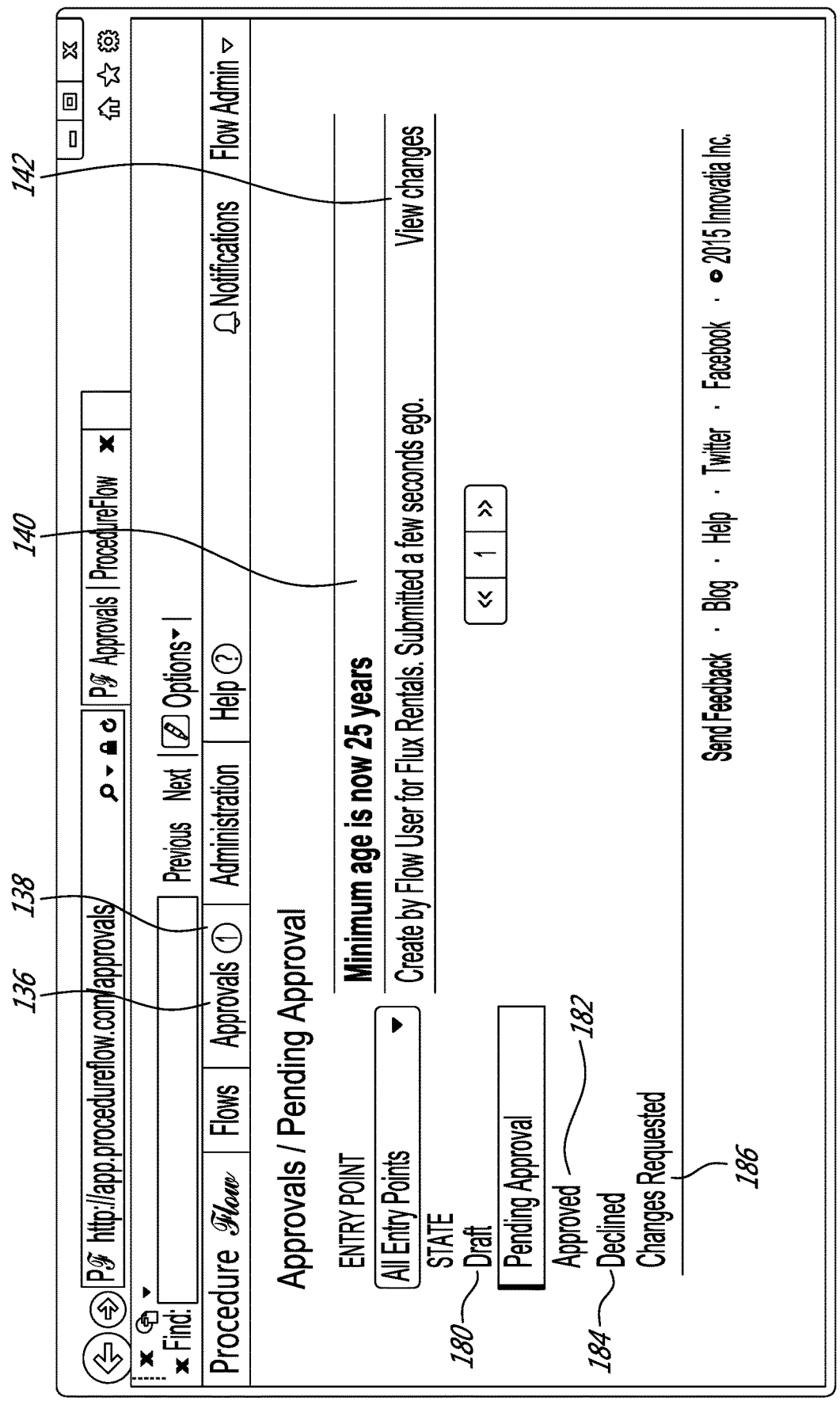
FIG. 8A provides an approvals screen detailing pending approvals for changes to a procedure flow in accordance with an illustrative embodiment of the present invention.

In a collaborative environment typically the one who originally entered modifications to a procedure flow is not the final arbiter of their incorporation in a live system. Rather, approval is often left to a more senior employee or system architect. Referring now to FIG. 8A, when logged into the system, users designated as having the right to approve a given procedure flow and its respective sub-procedure flows are presented an Approvals menu item 136 which includes an indication 138 of the number of approvals which are currently pending. By selecting the Approvals menu item 136 a list of pending approvals 140, if any, is displayed. The proposed changes can be reviewed by selecting a View changes link 142.

Figure 8B:
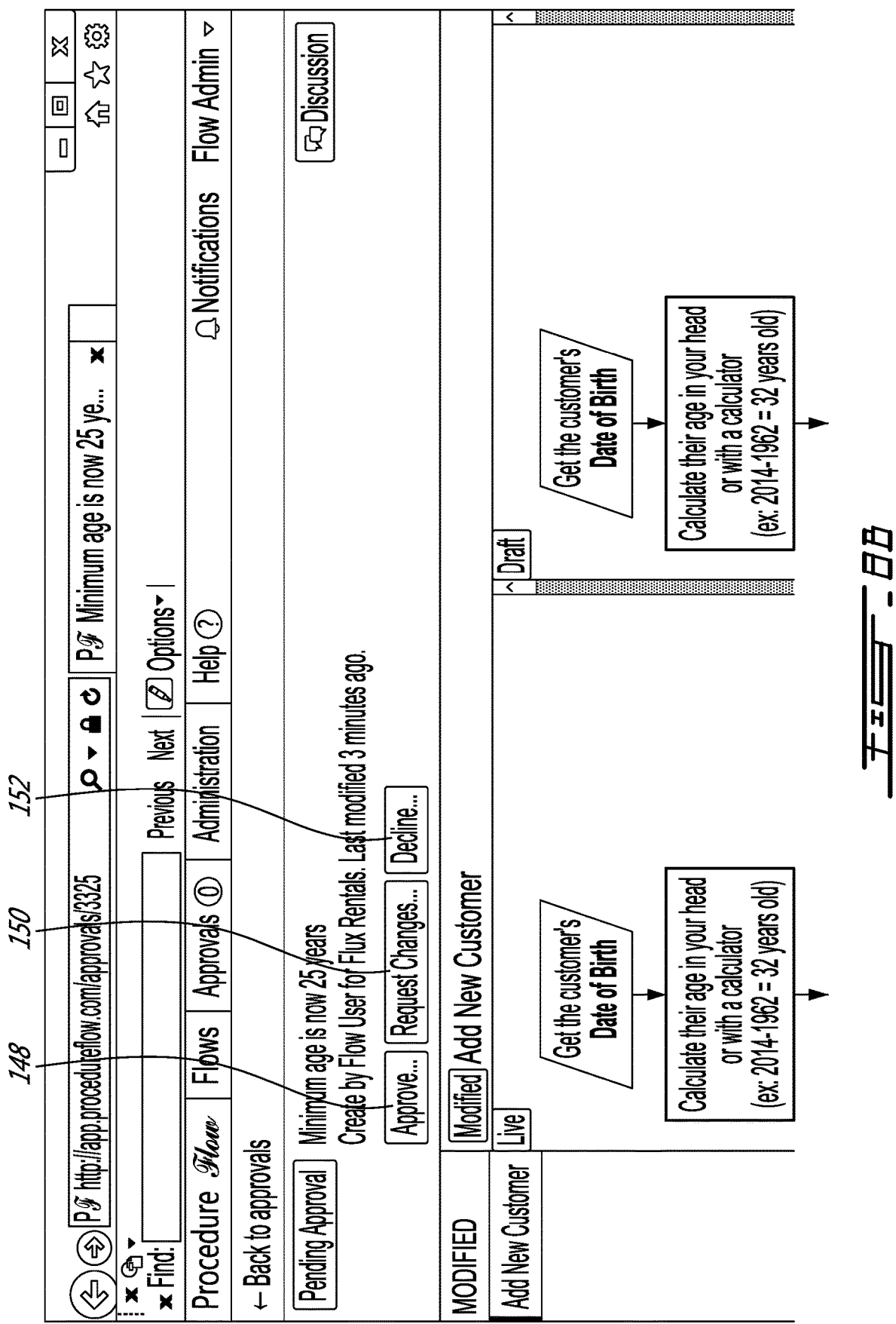
FIG. 8B provides a review screen in double pane mode for reviewing live versus edited procedure flows by an approver and in accordance with an illustrative embodiment of the present invention.
Figure 80:
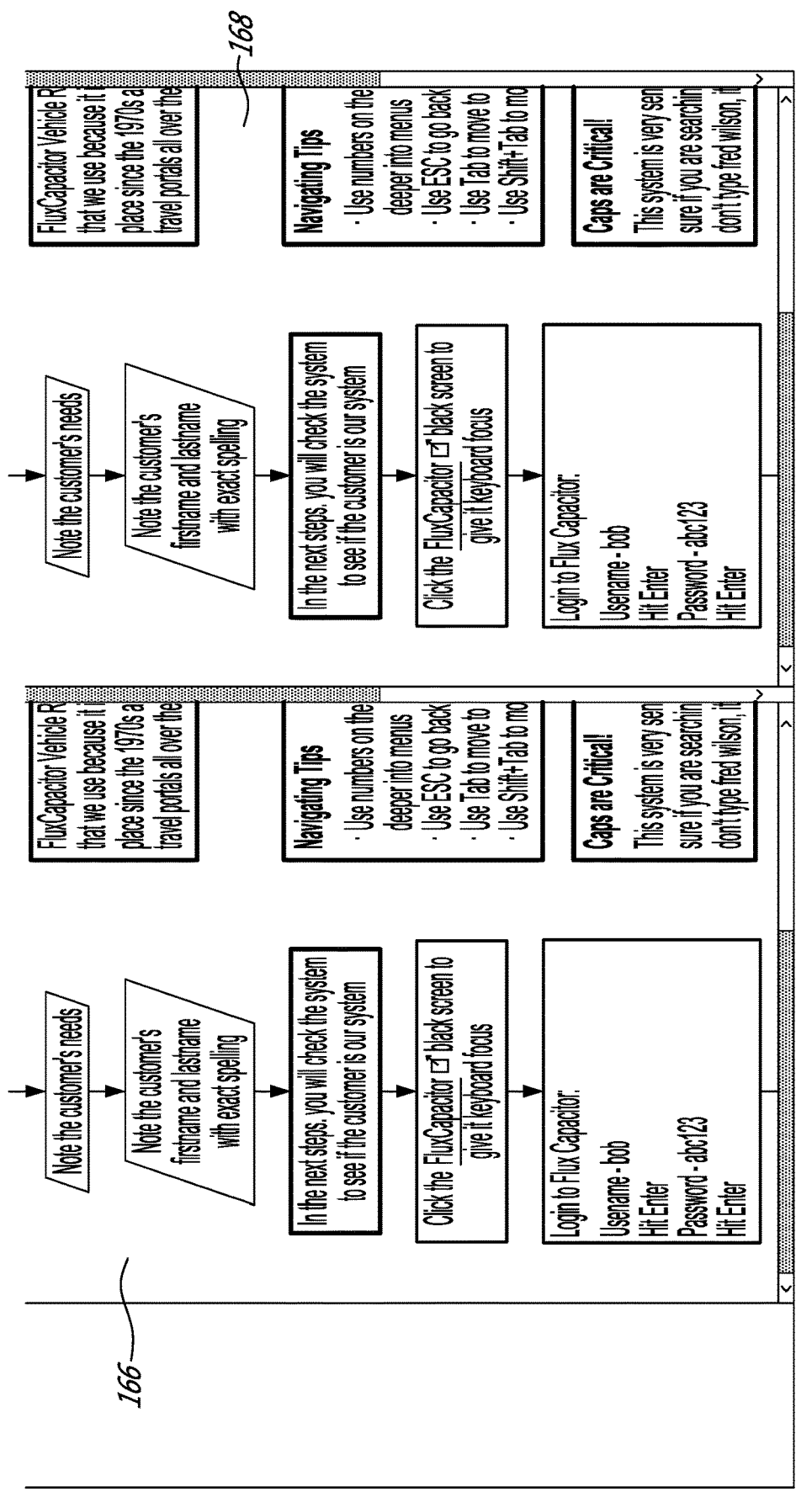

Referring to FIG. 8B, the actual live procedure flow 144 is displayed in the double pane mode adjacent the draft proposed changes 146. The changes can be either approved, by selecting the Approve . . . button 148, requested to be changed by selecting the Request Changes . . . button 150, or declined by selecting the Decline . . . button 152. On approval the live version is replaced with the proposed changes in the draft version and the changes are indicated as being approved.

Referring back to FIG. 3A, users of the system viewing a procedure flow which has been the subject of an approved edit or modification are made aware of the modification via an icon 154 illustratively displayed adjacent the Change History menu item 156.

Referring to FIG. 8C, a change history of changesets is maintained in the repository and can be listed by the users of the system by selecting the procedure flow in question via the Switch Entry Point pull down menu 60 and selecting the Change History 156 menu item. An indication of the user 158 who submitted the modification, the approver 160 and the date 162 the modification was approved is also provided. By selecting the View Changes link 164 both the Old Live version 166 and the New Live version 168 of the procedure flow can be displayed side by side using the double pane view as discussed above and as illustrated in FIG. 8D.

Referring now to FIG. 9A, in particular instances, for example when multiple users are editing the same procedure flow, it can occur that the live procedure flow is modified by a first user during the editing process by a second user. In this event, and to ensure that approved changes are incorporated first, prior to approving the procedure flow for use as the live procedure flow, the second user is prompted to merge approved changes to the live procedure flow into the procedure flow being edited.

Figure 9B:
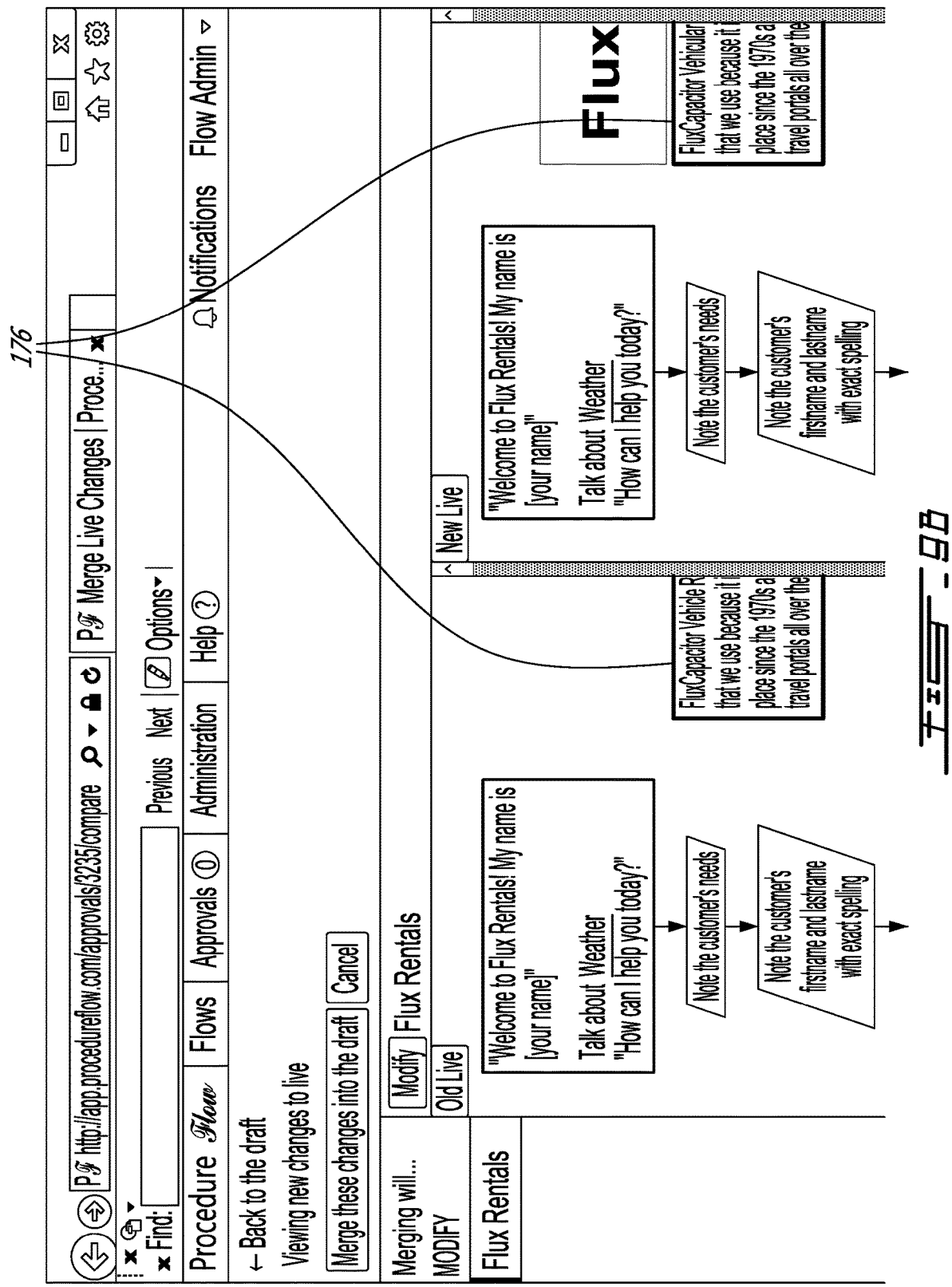
FIG. 9B provides a merge screen in double pane mode for reviewing old live versus new live procedure flows prior to merging in an edited procedure flow in accordance with an illustrative embodiment of the present invention.
Figure 9C:
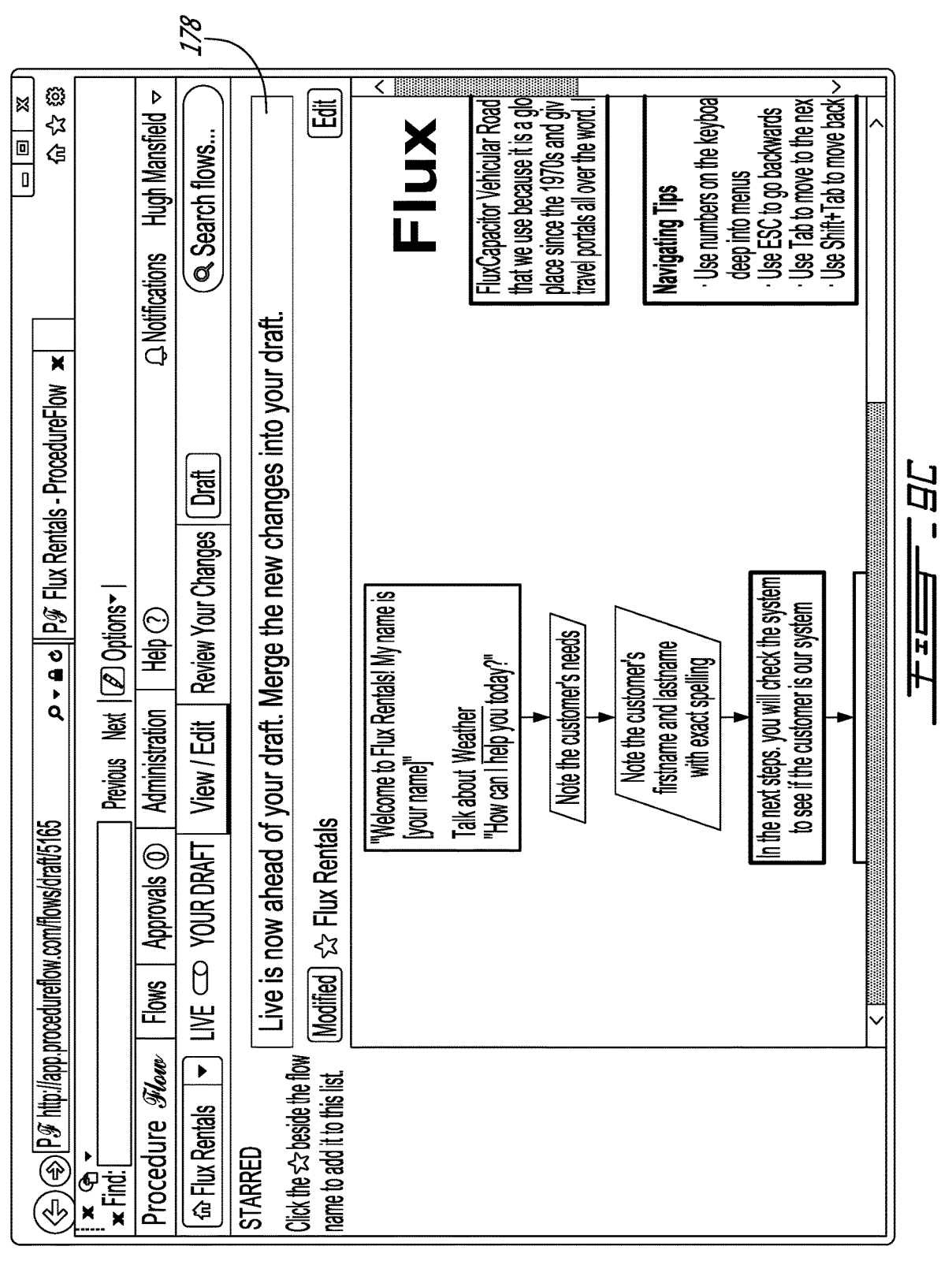

Referring now to FIG. 9B in addition to FIG. 9A, on selecting the Merge the new changes link 170, the Old Live procedure flow 172 is displayed adjacent the New Live procedure flow 174 with the modifications 176 highlighted. In this manner, an administrative user is able to review modifications proposed by one user even when the underlying process has approved modifications introduced by another user. Of note is that changes to the same procedure flow give rise to a conflict requiring the proposed modifications to be discarded and the approved live procedure flow reedited to incorporate the proposed modifications. On the other hand, changes to different sub procedure flows, for example, can be merged together. Similarly, in the event a user is working on modifications based on a live procedure flow which has subsequently been the subject of approved modifications on behalf of another user, as shown in FIG. 9C, the user receives a warning 178 to the effect that the current live version is ahead of the draft, and that changes to the current approved live procedure flow should be merged before continuing.

Referring back to FIG. 8A, procedure flows being edited by other users can be viewed by selecting Draft 180 from the Approvals menu following which the draft version and the live version are displayed side by side using the double pane mode and highlighting any differences. This allows, for example, a supervising user to view changes in the process of being made. Similarly, previously approved items can be viewed by selecting Approved 182 from the Approvals menu. Edited procedure flows which were submitted for approval but declined or where changes were requested can also be view by respectively selecting Declined 184 or Changes Requested 186 from the Approvals menu.

Figure 2B:
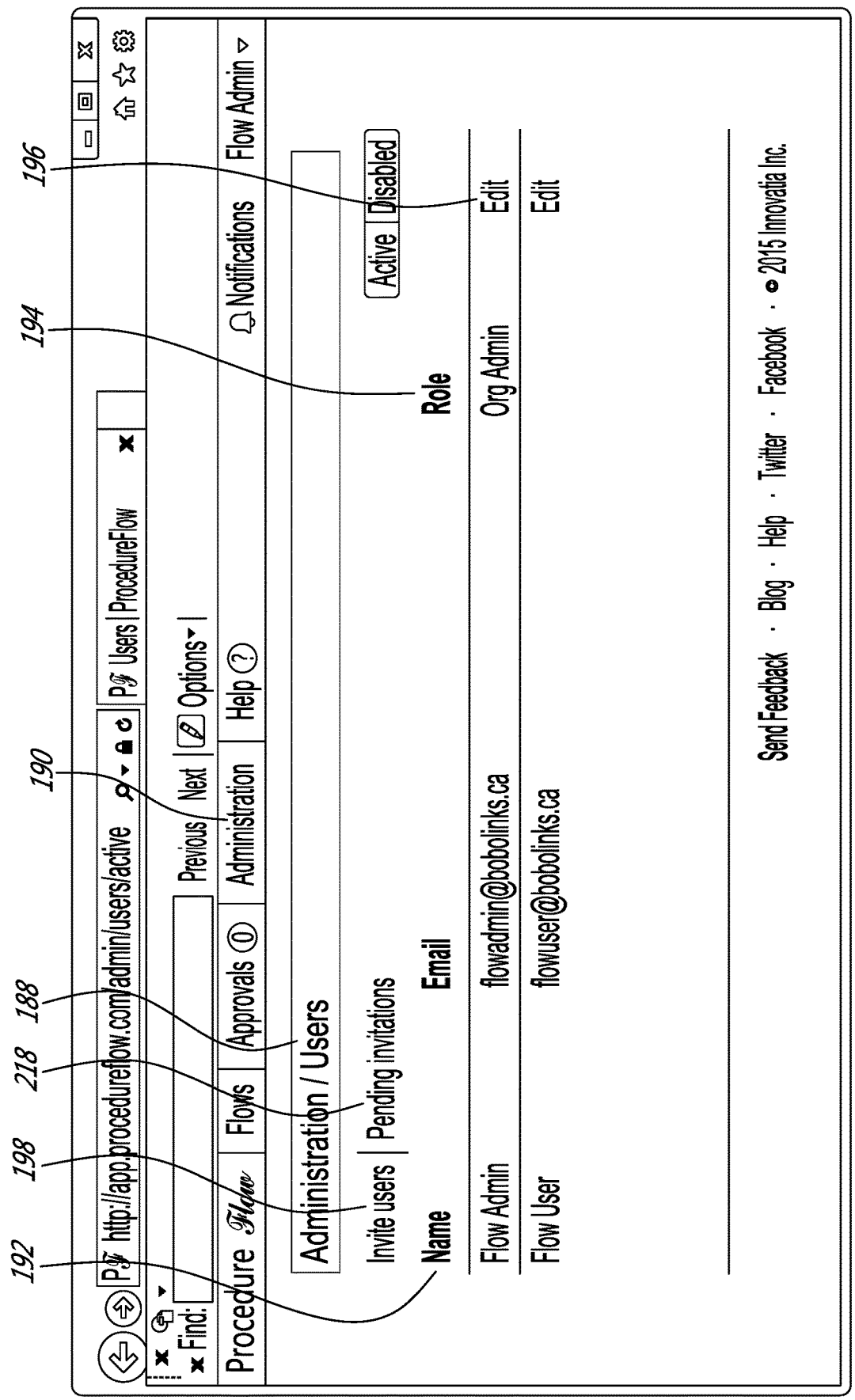
FIG. 2B provides a user administration screen of a procedure flow administration system in accordance with an illustrative embodiment of the present invention.

Referring back to FIG. 2A, as discussed above, each user can be assigned varying rights which may be used to selectively limit a given user's access to particular features of the system, or the ability to create, amend and/or approve edited procedure flows. Referring to FIG. 2B, by selecting Users 188 from the Administration menu item 190 the current users 192 of the system and their role 194 can be reviewed. Selecting the Edit link 196 allows an administrator, for example, to modify a user's name and role. Additionally a user can be disabled such that he is no longer able to access the system.

Referring to FIG. 2C in addition to FIG. 2B, one or more new users can be invited to use the system by selecting the Invite users link 198. The new users' email addresses 200 are entered together with an indication of the procedure flows (entry points) 202 to which the new user(s) should have access as well as their roles 204 vis-a-vis those procedure flows. As illustrated, four different types of roles are foreseen vis-a-vis a given procedure flow: viewer 206; contributor 208; approver 210; and admin 212. Alternatively, Organisation wide admin rights can be granted the new user(s) simply by selecting the Org Admin radio button 214.

Referring to FIG. 2D in addition to FIG. 2B, the status 216 of pending invitations can be viewed by selecting the Pending invitations link 218. A pending invitation may be resent by selecting the Resend button 220 or withdrawn by selecting the Withdraw button 222.

Figure 2E:
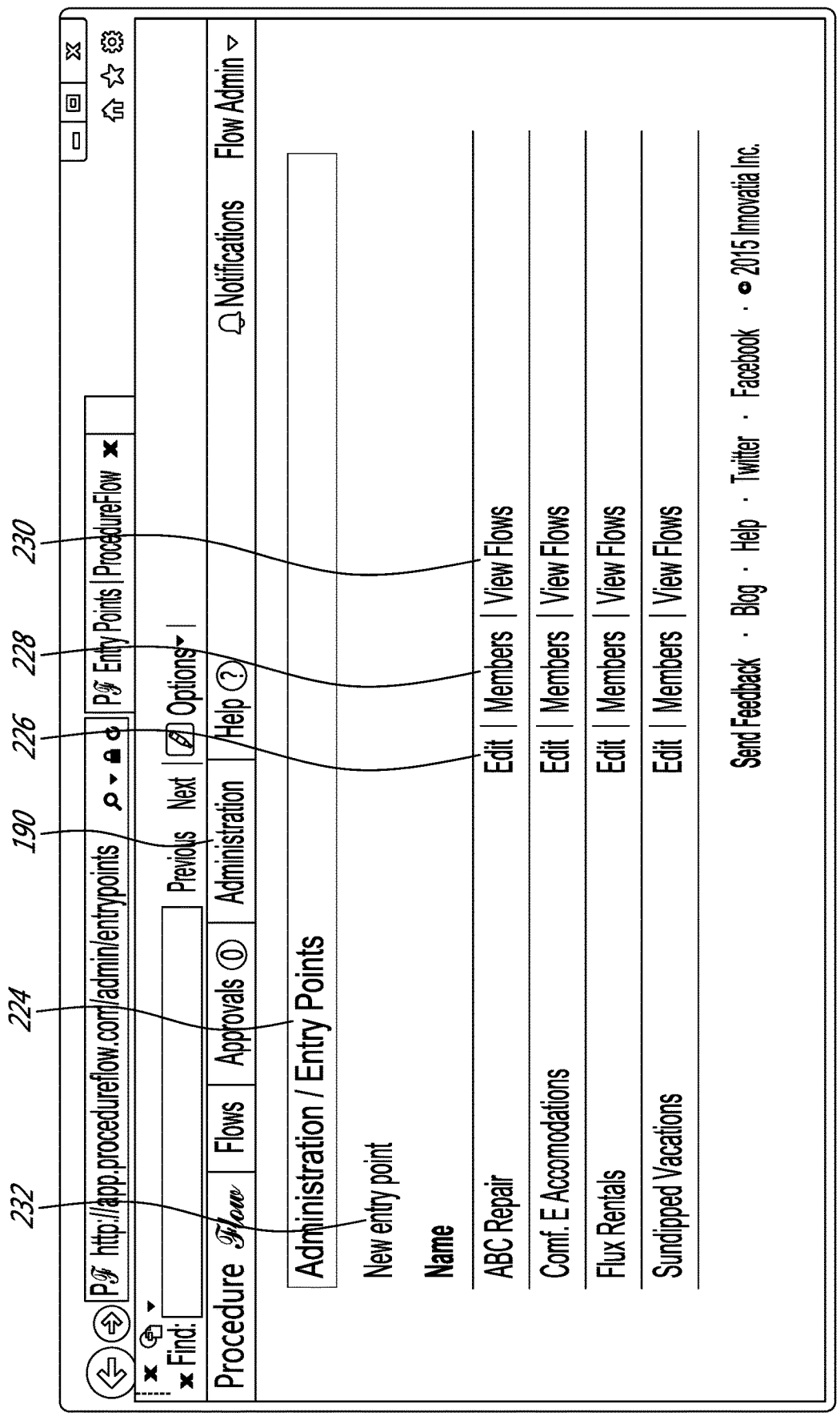
FIG. 2E provides a list entry point (procedure flow) screen of a procedure flow administration system in accordance with an illustrative embodiment of the present invention.

Referring to FIG. 2E, existing procedure flows can be listed by selecting the Entry Points link 224 from the Administration menu item 190. The name of a procedure flow can be edited by selecting the Edit link 226, users who have rights to access the procedure flow may be viewed and their roles edited by selecting the Members link 228 and a particular procedure flow viewed by selecting the View Flows link 230. New procedure flows (entry points) may be added by selecting the New entry point link 232.

Referring to FIG. 2F, unreviewed changesets of one or other of the procedure flows can be listed by selecting the reports link 234 and the Unreviewed Changes link 236 from the Administration menu item 190. This provides a means to show which members of a given entry point have or have not been reviewing the approved changesets. Illustratively, members are listed in order to number of unreviewed changes. Edits to a given procedure flow which have not been reviewed by a particular user can be listed by selecting the View changes link 238. This allows, for example, an administrator to examine whether particular users have in fact reviewed (and therefore adopted) approved edits to particular procedure flows (for example, in order to audit quality or the like). Referring to FIG. 2G selecting the View changes link 240 adjacent one or other of the listed edits as in 242 displays the procedure flow immediately subsequent the edit(s) adjacent the procedure flow immediately prior to the edit in a double pane mode as described above, with the edited elements highlighted in both panes.

While this invention has been described with reference to the illustrative embodiments, this description is not intended to be construed to a limiting sense. Various modifications or combinations of the illustrative embodiment of the invention will be apparent to persons skilled in the art upon reference to the description. It is therefore intended that the described invention encompass any such modifications or embodiments.

The invention claimed is:

1. A procedure flow administration system for supporting the collaborative editing and review of a live procedure flow by an editing user and a reviewing user, the live procedure flow comprising a plurality of steps to be followed by an executing user in a defined sequence and comprising at least one decision step and at least one action step, wherein each of the at least one steps is either proceeded or followed by at least one other of the steps according to said defined sequence, the system comprising:
   a communications network;
   a procedure flow application and a repository for storing the live procedure flow and a draft procedure flow, said repository accessible by said procedure flow application for procedure flow retrieval and storage;
   an editing client device comprising a display and interconnected with said procedure flow application via said network for retrieving the live procedure flow from said repository,
   wherein a graphical representation of the retrieved live procedure flow is rendered on said display and wherein a graphical representation of a copy of the retrieved live procedure flow is rendered on said display as the draft procedure flow, wherein each of said rendered graphical representations comprises a plurality of symbols each representative of respective ones of the steps, a plurality of texts each describing a respective one of the steps, and at least one flow arrow interconnecting a respective pair of said symbols,
   wherein a direction of flow indicated by said flow arrow is representative of the defined sequence in which the steps represented by said symbols are to be executed, said editing client further comprising at least one tool for modifying said draft procedure flow wherein said editing comprises one of adding a symbol representing an additional decision step, adding a symbol representing an additional action step, modifying one of said plurality of texts, adding a flow arrow interconnecting two of said steps, rerouting one of said at least one flow arrows, or deleting at least one of said at least one flow arrows, said editing client interconnected with said procedure flow application via said network for storing said modified procedure flow in said repository;

a reviewing client device comprising a display and interconnected with said procedure flow application via said network for retrieving the live procedure flow and said modified procedure flow from said repository, wherein a graphical representation of the retrieved live procedure flow is rendered on said display in a first display portion and a graphical representation of said retrieved modified procedure flow is rendered on said display in a second display portion adjacent to said first display portion, and wherein said first display portion and said second display portion are synchronized such that navigation about said graphical representation of one of said procedure flows in one of said display portions causes a like navigation about said graphical representation of another of said procedure flows in another of said display portions and further wherein differences between the retrieved live procedure flow and said retrieved modified procedure flow are highlighted on at least one of said graphical representation of the retrieved live procedure flow or said graphical representation of the retrieved modified procedure flow, and further wherein said reviewing client is interconnected with said procedure flow application via said network for replacing the live procedure flow in said repository with said modified procedure flow following approval;

wherein said navigation comprises scrolling and said first display portion and said second display portion are synchronized such that scrolling of said graphical representation of one of said procedure flows in one of said display portions causes a same scrolling of said graphical representation of another of said procedure flows in another of said display portions and zooming and said first display portion and said second display portion are synchronized such that zooming of said graphical representation of one of said procedure flows in one of said display portions causes a same zooming of said graphical representation of another of said procedure flows in another of said display portions.

2. The system of claim 1, wherein said repository comprises a database.

3. The system of claim 1, wherein said procedure flow application comprises a web-application server and said display of said editing client and said display of said reviewing client each comprise a web-browser.

4. The system of claim 1, wherein storing said modified draft procedure flow further comprises sending a notification to the reviewing user that the live procedure flow has been edited.

5. The system of claim 1, wherein the reviewing user rejects said modifications by sending a notification to the editing user that the procedure flow has been rejected or should be modified.

6. The system of claim 1, wherein on rejection the editing user can reedit said modifications and resubmit said reedited modifications to the reviewing user for one of approval and rejection.

7. The system of claim 1, wherein the live procedure flow and said modified draft procedure flow are held in a common repository and further wherein prior to said displaying act, said live procedure flow and said modified draft flow are retrieved from said common repository.

* * * * *